(12) United States Patent
Nagatani et al.

(10) Patent No.: US 10,363,645 B2
(45) Date of Patent: Jul. 30, 2019

(54) CONTROLLER AND CONVEYANCE SYSTEM

(71) Applicant: Mitsubishi Electric Corporation, Chiyoda-ku (JP)

(72) Inventors: Tatsuya Nagatani, Tokyo (JP); Hideaki Minamide, Tokyo (JP); Tsutomu Yoshikawa, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/774,716

(22) PCT Filed: Jul. 15, 2016

(86) PCT No.: PCT/JP2016/071008
§ 371 (c)(1),
(2) Date: May 9, 2018

(87) PCT Pub. No.: WO2017/138164
PCT Pub. Date: Aug. 17, 2017

(65) Prior Publication Data
US 2018/0327191 A1 Nov. 15, 2018

(30) Foreign Application Priority Data
Feb. 8, 2016 (JP) ................................ 2016-021694

(51) Int. Cl.
*B23Q 15/22* (2006.01)
*B23Q 15/24* (2006.01)
(Continued)

(52) U.S. Cl.
CPC ............ *B23Q 15/22* (2013.01); *B23Q 15/24* (2013.01); *B65G 43/00* (2013.01); *G05B 17/02* (2013.01);
(Continued)

(58) Field of Classification Search
CPC ................................ B23Q 15/22; B23Q 15/24
See application file for complete search history.

(56) References Cited

U.S. PATENT DOCUMENTS 3,939,389 A * 2/1976 Nopper ................... B23Q 15/24
318/578
5,164,896 A * 11/1992 Nagayasu ............... B23Q 15/24
318/467
(Continued)

FOREIGN PATENT DOCUMENTS

JP 2002-351511 A 12/2002
JP 2002-358114 A 12/2002
(Continued)

OTHER PUBLICATIONS

International Search Report dated Oct. 4, 2016 in PCT/JP2016/071008 filed Jul. 15, 2016.

*Primary Examiner* — Thomas Randazzo
(74) *Attorney, Agent, or Firm* — Oblon, McClelland, Maier & Neustadt, L.L.P.

(57) ABSTRACT

A workpiece simulation part estimates the amount of movement of the workpiece from drive information and estimates the current position of the workpiece by adding the amount of movement to the previous position of the workpiece, the drive information being generated for, among at least one actuator, an actuator that is assumed to constrain the workpiece under the constraint conditions. A sensor simulation part uses the current position of the workpiece to generate sensor simulation information. An input/output switching part transmits the drive information to the workpiece simulation part and transmits the sensor simulation information as alternate information of the sensor information to the control-program execution part.

10 Claims, 16 Drawing Sheets

(51) Int. Cl.
  *G05B 17/02* (2006.01)
  *G05B 19/042* (2006.01)
  *B65G 43/00* (2006.01)
  *G05B 19/418* (2006.01)

(52) U.S. Cl.
  CPC ....... *G05B 19/042* (2013.01); *G05B 19/0423* (2013.01); *G05B 19/4189* (2013.01); *G05B 2219/32357* (2013.01)

(56) References Cited

U.S. PATENT DOCUMENTS

| | | | | |
|---|---|---|---|---|
| 5,568,032 | A * | 10/1996 | Wakui | B23Q 15/22 310/311 |
| 5,768,122 | A * | 6/1998 | Motoc | B25J 9/1664 700/18 |
| 6,973,355 | B2 * | 12/2005 | Tisue | G02B 26/105 342/132 |
| 2004/0015244 | A1 | 1/2004 | Fujinami et al. | |
| 2014/0088949 | A1 | 3/2014 | Moriya et al. | |
| 2014/0214384 | A1 | 7/2014 | Kawahito | |

FOREIGN PATENT DOCUMENTS

| | | | | |
|---|---|---|---|---|
| JP | 2012198636 A | * | 10/2012 | ........... G05B 19/042 |
| JP | 2014-63327 A | | 4/2014 | |
| JP | 2014-148389 A | | 8/2014 | |

* cited by examiner

FIG. 2

| NUMBER | NAME | SIZE(X,Y,Z) | INITIAL POSITION/POSTURE (X,Y,Z,Rx,Ry,Rz) |
|---|---|---|---|
| 1 | Part_1_1 | (20, 15, 10) | (200, 0, 300, 0, 0, 0) |
| 2 | Part_1_2 | (20, 15, 10) | (200, 0, 300, 0, 0, 0) |
| 3 | Part_2 | (10, 10, 5) | (400, 0, 250, 0, 0, 0) |

FIG. 3

| NUMBER | NAME | MOTION DIRECTION | SIZE | INITIAL POSITION |
|---|---|---|---|---|
| 1 | Axis_1 | (0, 1, 0) | 20 | 0 |
| 2 | Axis_2 | (0, 1, 0) | 20 | 0 |
| 3 | Axis_3 | (-1, 0, 0) | 5 | 50 |

F I G. 6

| NUMBER | NAME | NORMAL OUTPUT | DETECTION TARGET | DETECTION POSITION |
|---|---|---|---|---|
| 1 | input_1 | OFF | Work | (200, 0, 300) |
| 2 | input_2 | OFF | Work | (500, 0, 300) |
| 3 | input_3 | ON | Axis_1 | 50 |

FIG. 8
| NUMBER | NAME | MOTION DIRECTION | SPEED |
|---|---|---|---|
| 1 | conveyor_1 | [1, 0, 0] | 20000 |
| 2 | conveyor_2 | [0, 1, 0] | 15000 |
FIG. 9
| NUMBER | NAME | STOP DIRECTION | STOP POSITION |
|---|---|---|---|
| 1 | stopper_1 | [1, 0, 0] | 500 |
| 2 | stopper_2 | [1, 0, 0] | 800 |
FIG. 10
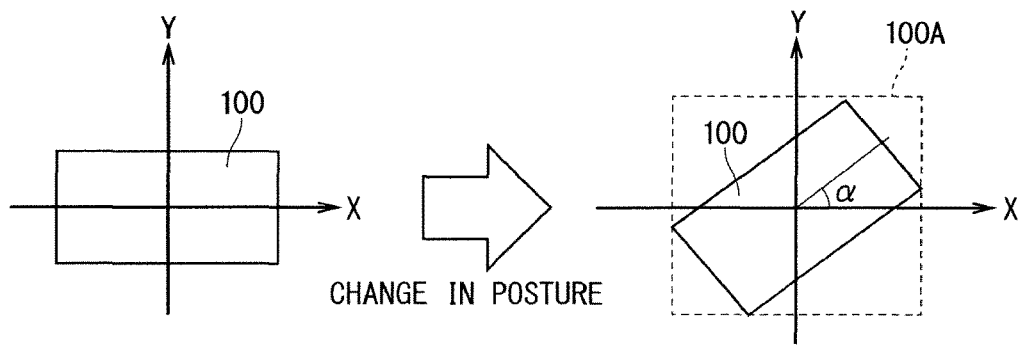
CHANGE IN POSTURE
FIG. 11
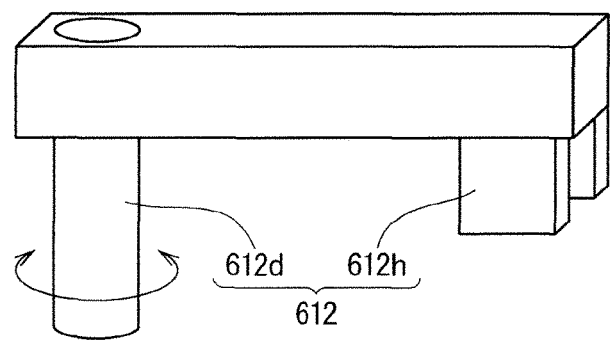

F I G. 1 6

| NUMBER | NAME | TRIGGER | TIME LAG | OUTPUT |
|--------|----------|-----------|----------|--------|
| 1 | signal_1 | trigger_1 | 500ms | ON |
| 2 | signal_2 | trigger_2 | 3sec | 100 |

F I G. 1 9
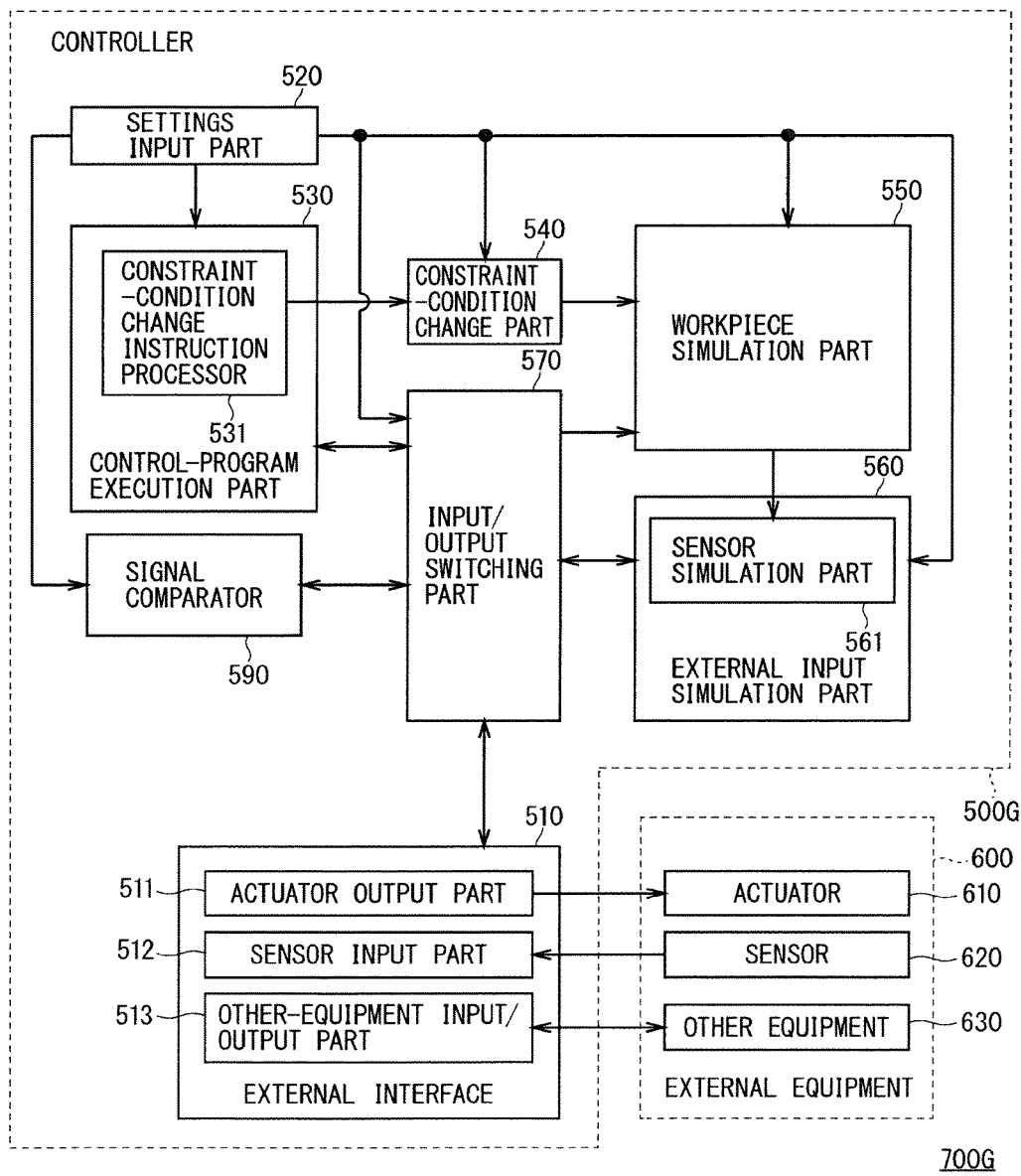

US 10,363,645 B2

CONTROLLER AND CONVEYANCE SYSTEM

CROSS-REFERENCE TO RELATED APPLICATIONS

This application is a United States national stage application of International Application No. PCT/JP2016/071008, filed Jul. 15, 2016, which designates the United States, and claims priority to Japanese Patent Application No. 2016-021694, filed Feb. 8, 2016, and the entire contents of each of the above applications are hereby incorporated herein by reference in entirety.

TECHNICAL FIELD

The present invention relates to a controller and a conveyance system, and in particular to a controller for outputting a drive signal to an actuator while referencing a sensor signal received from a sensor, and a conveyance system using the controller.

BACKGROUND ART

Conveyance systems, i.e., systems for conveying articles, are used in various applications, such as in a production unit in a factory. Articles that are conveyed in a conveyance system are hereinafter referred to as "workpieces." A conveyance system usually includes an actuator for moving workpieces, a sensor for detecting workpieces, and a controller for controlling the actuator and the sensor. Simulation techniques have conventionally been used for the performance test of the controller.

Japanese Patent Application Laid-Open No. 2014-148389 (Patent Literature 1) discloses an information processor that performs a simulation operation of conveying carrier articles by a conveyor. A workpiece, a lifter, and a table are disposed in a three-dimensional simulation space. The information processor executes a simulation operation of conveying the workpiece disposed on the table by the lifter. When the lifter moves the workpiece on the table in an upward direction, the information processor sets a priority that indicates the degree of integration of the lifter with the workpiece to be higher than a priority that indicates the degree of integration of the table with the workpiece. When the lifter moves to below the table during conveyance of the workpiece, the information processor sets the priority of the lifter to be lower than the priority of the table.

Japanese Patent Application Laid-Open No. 2014-063327 (Patent Literature 2) discloses a simulation device. The simulation device includes a processor that performs a simulation of a control program that is executed by a controller for controlling the movement of a machine that handles target articles. The processor includes operation control means, determination means, and follow-up means. The operation control means controls the movement of a virtual machine, which corresponds a machine in a virtual space, according to the control program and on the basis of an operation command to move the virtual machine. The determination means determines, on the basis of model data of a virtual target article that corresponds to a target article handled by the virtual machine and model data of the virtual machine, whether the volume of the region where the virtual target article overlaps with a working space in which the virtual machine can operate is greater than or equal to a predetermined reference value. When the volume is greater than or equal to the reference value, the follow-up means causes the virtual target article to follow the movement of the virtual machine based on the operation command.

Japanese Patent Application Laid-Open No. 2002-358114 (Patent Literature 3) discloses a simulation device that performs a simulation of operations of equipment in accordance with a program for a sequencer. The simulation device includes state calculation means and pseudo-signal generation means. The state calculation means simulates a change in the state of the equipment on the basis of an output from the sequencer and calculates a state of change in the equipment at a predetermined time interval. The pseudo-signal generation means generates a pseudo signal in accordance with the state of change in the equipment calculated by the state calculation means, the pseudo signal being a signal to be output to the sequencer and relevant to the above state. That is, this simulation device performs a simulation in two steps. First, the simulation device simulates the output from the sequencer, i.e., how the state of the equipment changes in accordance with the operation command. Then, the simulation device simulates whether the equipment has entered a state of generating the pseudo signal, or in short, whether there is a change in the output of a detector that detects a change in the state of the equipment, as a result of the movement of the equipment. The state of the equipment as used herein refers to, for example, the state of the actuator and the workpiece. The detector may be configured to detect whether the workpiece is present at a predetermined position.

Japanese Patent Application Laid-Open No. 2002-351511 (Patent Literature 4) discloses an input generation device for use in a controller. The controller includes PLC means, input interface means, and output interface means. The PLC means has functions defined as software and executes a control application. The input interface means interfaces signals from actual processes to the PLC means. The output interface means interfaces signals from the PLC means to actual processes. The input generation device applied to the controller includes pseudo-input generation means having functions defined as software, and actual input-pseudo input switching means. The pseudo-input generation means generates a simulated input signal in accordance with a signal from the output interface means. When using the simulated input signal, the actual input-pseudo input switching means supplies the signal received from the output interface means to the pseudo-input generation means and supplies an output signal of the pseudo-input generation means to the aforementioned input interface means.

PRIOR ART DOCUMENTS

Patent Literatures

Patent Literature 1: Japanese Patent Application Laid-Open No. 2014-148389
Patent Literature 2: Japanese Patent Application Laid-Open No. 2014-063327
Patent Literature 3: Japanese Patent Application Laid-Open No. 2002-358114
Patent Literature 4: Japanese Patent Application Laid-Open No. 2002-351511

SUMMARY

Problems to be Solved by Invention

The above-described technique of Patent Literature 1 is only applicable to the specific configuration, i.e., a configuration in which the lifter conveys the workpiece disposed on the table. That is, this technique lacks general versatility. Besides, the technique requires the setting of priorities to all parts that act on the workpiece, and this setting needs to be designed individually depending on a target article to be simulated. Such a design operation is not easy.

The above-described technique of Patent Literature 2 is more versatile than the above-described technique of Patent Literature 1 and thus considered applicable to more various conveyance systems. However, this method is subject to a heavy calculation load because it requires calculation processing that involves dividing the operation space or the virtual target article into a plurality of unit areas. Moreover, the techniques of Patent Literatures 1 and 2 are sheer simulation techniques and are not intended to be used for the tests of actual conveyance systems.

Unlike the above-described techniques of Patent Literatures 1 and 2, the above-described technique of Patent Literature 3 is capable of verifying the program for the sequencer (controller) used in the real conveyance system, on the basis of the output from the sequencer. With this method, however, a simulation is performed by the simulation device connected to the controller of the conveyance system. Thus, the simulation device is necessary in addition to the controller. The method also requires communication between the controller and the simulation device. Communication between the controller and a computer causes a time lag in communication. Thus, the timing when an event occurs differs between the operating conditions of an actual system and the simulated operating conditions of that system. A program used in a conveyance system often contains descriptions of control relying on real-time communication and calculation processing in order to improve performance, and therefore, accurate tests are difficult to conduct when the timing is off due to a time lag in communication.

Unlike the above-described techniques of Patent Literatures 1 to 3, the above-described technique of Patent Literature 4 describes that a simulation is performed within the controller of an actual system. However, a specific application example described in Patent Literature 4 is only a plant training system, and a specific method for applying this technique to a conveyance system is not disclosed. If this technique is combined with a highly versatile simulation technique targeted for conveyance systems such as the above-described technique of Patent Literature 2, the controller in the system requires many calculation resources in order to process this simulation. However, the controller used in the conveyance system typically does not have many calculation resources, unlike a computer suitable for simulation applications. Thus, even if the combination of techniques such as that described above is possible, it is difficult to conduct accurate tests on the conveyance system.

The present invention has been made in order to solve problems such as those described above, and it is an object of the present invention to provide a controller and a conveyance system that are capable of performing a simulation of sensor information easily and with use of the controller in the conveyance system, without depending heavily on the type of the conveyance system.

Means to Solve the Problems

A controller according to the present invention is a controller for use in a conveyance system that outputs a drive signal to at least one actuator that conveys a workpiece while referencing a sensor signal received from at least one sensor that detects the workpiece. The controller includes an external interface, a settings input part, a control-program execution part, a constraint-condition change part, a workpiece simulation part, a sensor simulation part, and an input/output switching part. The external interface includes an actuator output part and a sensor input part. The actuator output part receives drive information for controlling the actuator and transmits the drive signal to the actuator in accordance with the drive information. The sensor input part receives the sensor signal from the sensor and generates sensor information in accordance with the sensor signal. The settings input part receives input of a control program and constraint-condition setting information from a user. The control program is a program for generating the drive information while referencing the sensor information. The constraint-condition setting information is instruction information that is associated with the control program to change a constraint condition assumed between the workpiece and the actuator. The control-program execution part processes the control program and includes a constraint-condition change instruction processor. The constraint-condition change instruction processor issues a constraint-condition change instruction in accordance with the constraint-condition setting information. The constraint-condition change part manages the constraint condition in accordance with the constraint-condition change instruction issued by the constraint-condition change instruction processor. The workpiece simulation part estimates an amount of movement of the workpiece from the drive information and estimates a current position of the workpiece by adding the amount of movement to a previous position of the workpiece, the drive information being generated by the control-program execution part and generated for, among at least one actuator, an actuator that is assumed to be constrained by the workpiece under the constraint condition managed by the constraint-condition change part. The sensor simulation part uses information about the current position of the workpiece estimated by the workpiece simulation part to generate sensor simulation information that simulates the sensor information. The input/output switching part has at least a sensor simulation mode as an operation mode. In the sensor simulation mode, the input/output switching part transmits the drive information generated by the control-program execution part to at least the workpiece simulation part and transmits the sensor simulation information generated by the sensor simulation part as alternate information of the sensor information to the control-program execution part.

A conveyance system according to the present invention includes an actuator, a sensor, and a controller. The actuator conveys a workpiece. The sensor detects the workpiece. The controller is configured to output a drive signal to the actuator while referencing a sensor signal received from the sensor. The controller includes an external interface, a settings input part, a control-program execution part, a constraint-condition change part, a workpiece simulation part, a sensor simulation part, and an input/output switching part. The external interface includes an actuator output part and a sensor input part. The actuator output part receives drive information for controlling the actuator and transmits the drive signal to the actuator in accordance with the drive information. The sensor input part receives the sensor signal from the sensor and generates sensor information in accordance with the sensor signal. The settings input part receives input of a control program and constraint-condition setting information from a user. The control program is a program for generating the drive information while referencing the sensor information. The constraint-condition setting information is instruction information that is associated with the control program to change a constraint condition assumed between the workpiece and the actuator. The control-program execution part processes the control program and includes a constraint-condition change instruction processor. The constraint-condition change instruction processor issues a constraint-condition change instruction in accordance with the constraint-condition setting information. The constraint-condition change part manages the constraint condition in accordance with the constraint-condition change instruction issued by the constraint-condition change instruction processor. The workpiece simulation part estimates an amount of movement of the workpiece from the drive information and estimates a current position of the workpiece by adding the amount of movement to a previous position of the workpiece, the drive information being generated by the control-program execution part and generated for, among at least one actuator, an actuator that is assumed to be constrained by the workpiece under the constraint condition managed by the constraint-condition change part. The sensor simulation part uses information about the current position of the workpiece estimated by the workpiece simulation part to generate sensor simulation information that simulates the sensor information. The input/output switching part has at least a sensor simulation mode as an operation mode. In the sensor simulation mode, the input/output switching part transmits the drive information generated by the control-program execution part to at least the workpiece simulation part and transmits the sensor simulation information generated by the sensor simulation part as alternate information of the sensor information to the control-program execution part.

Effects of Invention

According to the present invention, the sensor simulation information that simulates sensor information is generated using information about the estimated current position of the workpiece. The current position of the workpiece is estimated by adding the estimated amount of movement of the workpiece to the previous position of the workpiece. The amount of movement of the workpiece is estimated from the drive information that is generated by the control-program execution part and generated for, among at least one actuator, an actuator that is assumed to be constrained by the workpiece under the constraint condition. The constraint condition is managed in accordance with the constraint-condition setting information. The constraint-condition setting information can be created easily by a user referencing the control program of the conveyance system, without depending heavily on the type of the conveyance system. Accordingly, a simulation of the sensor information can be performed easily without depending heavily on the type of the conveyance system. The obtained sensor simulation information can be used as alternate information when the conveyance system is tested in the absence of the sensor information, or as reference information under actual operating conditions of the conveyance system.

The estimated amount of movement of the workpiece can be obtained easily on the basis of the drive information that is generated by the control-program execution part and generated for, among at least one actuator, an actuator that is assumed to be constrained by the workpiece under the constraint condition managed by the constraint-condition change part. This estimated amount of movement is added to the previous position of the workpiece to estimate the current position of the workpiece. As described above, the estimated amount of movement of the workpiece can be obtained easily from the drive information, and the current position of the workpiece can be estimated through simple computation using the estimated amount of movement. Thus, the current position of the workpiece can be estimated with little computation. Accordingly, even the controller of the conveyance system, which generally has less calculation resources than a computer suitable for simulation applications, can perform a real-time simulation.

As described above, the present invention allows a simulation of the sensor information to be performed easily and with use of the controller of the conveyance system, without depending heavily on the type of the conveyance system.

These and other objects, features, aspects and advantages of the present invention will become more apparent from the following detailed description of the present invention when taken in conjunction with the accompanying drawings.

BRIEF DESCRIPTION OF DRAWINGS

FIG. 2 is an illustration showing an example of setting information about workpieces, received by a settings input part in FIG. 1.

FIG. 3 is an illustration showing an example of setting information about actuators, received by the settings input part in FIG. 1.

FIG. 6 is an illustration showing an example of setting information about sensors in FIG. 1.

FIG. 8 is an illustration showing an example of setting information about conveyers serving as actuators, received by the settings input part according to a variation of Embodiment 1.

FIG. 9 is an illustration showing an example of setting information about stoppers serving as actuators, received by the settings input part according to a variation of Embodiment 1.

FIG. 10 is an illustration of a method for calculating the size of a workpiece whose posture has been changed, according to a variation of Embodiment 1.

FIG. 11 is a perspective view showing an example of an actuator included in a conveyance system according to Embodiment 2 of the present invention.

FIG. 16 is an illustration showing an example of setting information about other equipment, received by a settings input part in FIG. 15.

FIG. 19 is a block diagram schematically illustrating a configuration of a conveyance system according to Embodiment 7 of the present invention.

DESCRIPTION OF EMBODIMENTS

Figure 1:
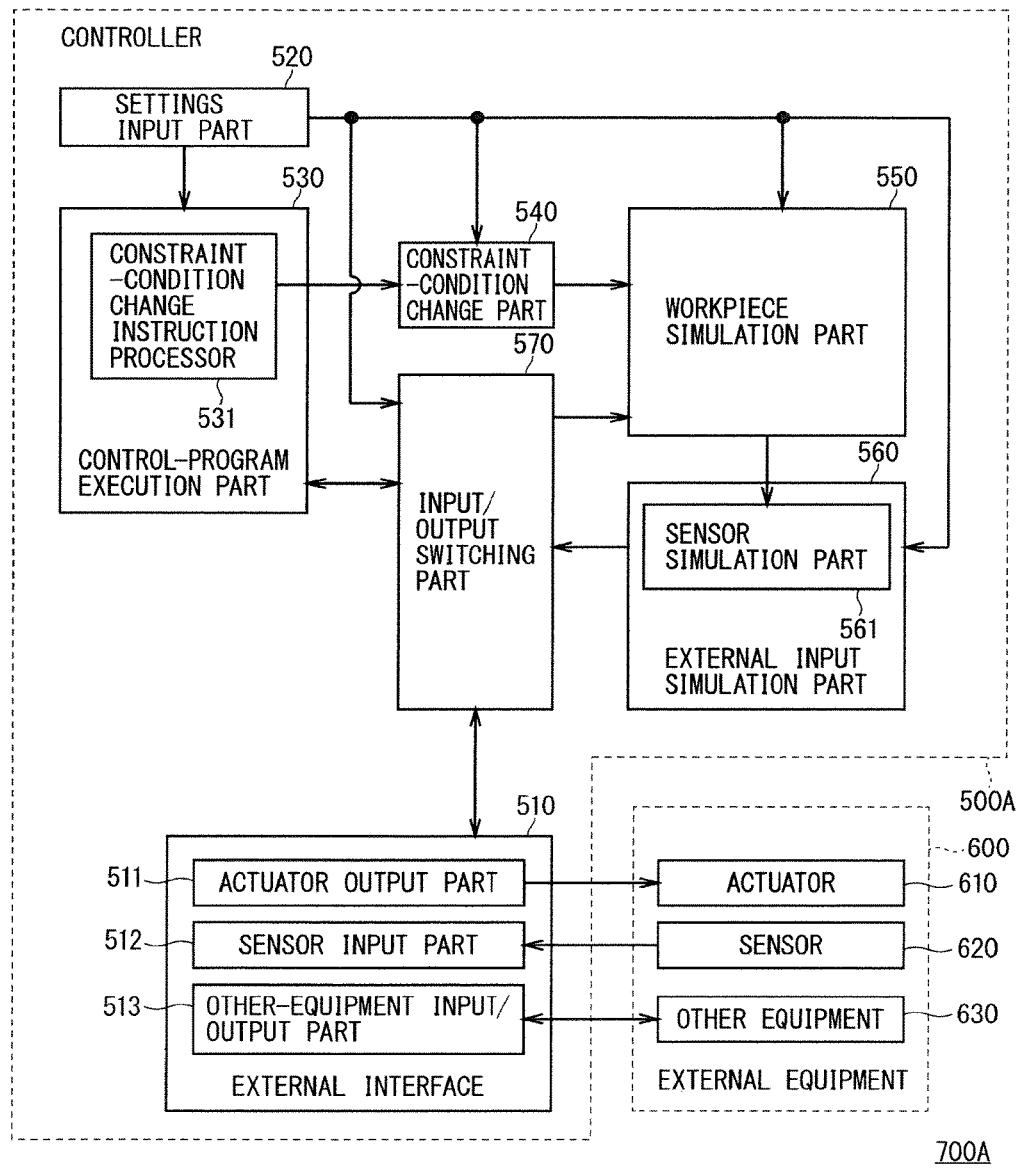
FIG. 1 is a block diagram schematically illustrating a configuration of a conveyance system according to Embodiment 1 of the present invention.

Embodiments of the present invention will be described hereinafter with reference to the drawings. In the following drawings, constituent elements that are identical or correspond to one another are given the same reference numerals, and descriptions thereof have been omitted.

Preliminary Description

Controllers according to Embodiments 1 to 7 described below may be used for a factory automation (FA) application employed to control a production unit in a factory. In this application, the controller simulates the movement of a workpiece that flows in the production unit. On the basis of the simulated movement of the workpiece, the controller simulates an input signal received from a sensor that detects the position of the workpiece. An operator (user) of the production unit can easily make settings for such operations. Specifically, the operator can set a workpiece movement simulation method that conforms to the configuration of the production unit by using a general-purpose technique according to a fixed procedure, instead of designing such a simulation method in a trial-and-error manner.

Before giving a specific description of embodiments of the present invention, the controller for use in FA applications and the operation of starting up and adjusting the production unit with use of the controller will be described below as the contents relevant to the embodiments of the present invention.

A controller for use in FA applications, employed mainly for a production unit in a factory, controls a plurality of external devices connected to the controller. Among these external devices, those that are connected via power lines to the controller and that communicate with the controller via ON/OFF digital signals are collectively referred to as I/O (Input/Output) devices. Examples of the I/O devices include input devices of the controller such as a sensor or a switch, and output devices such as an indicating lamp or a motor that operate someway in accordance with output signals from the controller. Examples of the external devices also include a servo amplifier that controls a servomotor, and other controllers. Communication with these external devices handles information other than ON/OFF information and is thus often implemented via cables dedicated to communication and special-purpose circuits; therefore, these external devices are often distinguished from I/O devices in the narrow sense. Modes of connection to the external devices include, for example, a mode implemented by the controller alone that has a typical hardware configuration, and a mode implemented by connecting a special-purpose device to the controller. These controllers are collectively referred to as the "controller" in the following description.

The production unit in a factory is often configured to detect the position of a workpiece with a sensor called a "stock sensor" and operate using an input signal received from the sensor as a trigger. In addition to being used as a trigger signal, the input signal from the stock sensor is often also used as a confirmation signal for reconfirming the presence or absence of a workpiece that serves as a part before execution of the operation. The stock sensor may be a reflection type optical sensor that integrates a projector with a photodetector. This sensor operates in such a manner that, when a workpiece has moved to in front of the sensor, light from the projector is reflected off the workpiece and enters the photodetector. As a result, the presence of the workpiece is detected. Unlike human beings, the production unit normally cannot make visual checks and therefore is often configured to detect the workpiece with the stock sensor every time the workpiece is moved.

The operation of starting up and adjusting the production unit involves so-called idling in many cases. Idling as used herein refers to an operation that does not involve a flow of workpieces. In an operation that involves a flow of workpieces, machines in the production unit and workpieces come into contact with one another, and they may be damaged if there are defects in, for example, the operating program of the conveyance system. Thus, a full-scale test involving a flow of workpieces is usually carried out only after the normal operability of the production unit is confirmed by idling. There may also be cases where idling is an absolute necessity, such as where workpieces are expensive or where only a small number of workpieces are prepared for adjustment.

Idling often requires some contrivance for implementation because it differs from the normal operation that involves a flow of workpieces. As described above, the production unit often uses the stock sensor as a trigger signal or a confirmation signal. In this case, if idling is carried out without any contrivance, those signals may take abnormal values due to the absence of a workpiece, thus making it difficult to carry out idling as a test. In view of this, some changes may be made to a program for the purpose of idling. Specific examples of the changes include commenting out a description about confirmation by the stock sensor, and rewriting the content that describes handling of the input signal from the stock sensor into the content that describes handling of other signals. In the case of making such changes to the program, careless mistakes and unintended logic changes in logic have to be avoided. In order to avoid such mistakes, it is necessary to completely understand the operations of the machines in the conveyance system and the contents of the control program and then to perform the operation of correcting and recreating a program on a device-by-device basis or for each operation that requires confirmation. Such operations have conventionally taken much time.

Moreover, it is useful to, before actual operation, briefly check not only the behavior of the production unit during steady operation but also the behavior thereof in cases where various errors have occurred due to physical factors, not due to the program, such as an error caused by clogging of a workpiece in the conveyer or a parts supply part, or an error caused by unstable sensor detection. This is because if such an error occurs during actual operation and a need arises to correct the control program as a counteractive action, it becomes necessary to stop the production unit for some time, which may result in considerable damage. However, in many cases, the occurrence of such physical errors is accidental during the operation of the production unit, and it is difficult under present circumstances to verify all errors at the time of starting up and adjusting the production unit.

In view of this, the inventors of the present invention studied the method for simulating the movement of a workpiece and a change in the sensor signal from the stock sensor associated with the movement of the workpiece, while intending primarily to enable the implementation of idling and the verification of various errors. If the sensor signal from the stock sensor can be simulated, idling can be implemented under conditions close to the actual operating conditions by using the sensor signal. Moreover, even if errors to be verified are caused by physical factors and their occurrence is incidental, a simulation allows such errors to be checked immediately without waiting for the incidental occurrence of the errors.

In order to perform a simulation under conditions close to the actual operating conditions, the simulation needs to be performed, not by a computer that is additionally connected to the conveyance system, but by the controller of the conveyance system itself. This is because, in the former case, a time lag may occur in communication for interfacing between the controller and the computer, and accordingly the timing of, for example, generating the sensor signal may differ from that during actual operation. In particular, in the production unit, the program often contains descriptions of control relying on real-time communication and calculation processing in order to improve the performance of the conveyance system; therefore, it is difficult to perform accurate check operations when the timing is off due to a time lag in communication.

Each embodiment described below has been studied in light of the above-described problems or demand.

Embodiment 1

Configuration

FIG. 1 is a block diagram schematically illustrating a configuration of a conveyance system according to an embodiment of the present invention. A conveyance system 700A according to the present embodiment includes an actuator 610, a sensor 620, and a controller 500A. The actuator 610 conveys workpieces. The sensor 620 includes a sensor that detects workpieces. The controller 500A is configured to output a drive signal to the actuator 610 while referencing a sensor signal received from the sensor 620. The drive signal is output from the controller 500A in accordance with drive information generated within the controller 500A. To simplify the description, the present embodiment primarily describes a case where the drive information represents a command signal that indicates an absolute position of a servomotor in the actuator. The drive signal output from the controller 500A in accordance with the drive information may also represent a command signal that indicates the absolute position of the servomotor in the actuator. The drive signal may also be a command signal that indicates an operation specification value input to a servo amplifier that supplies power to the servomotor in the actuator.

The controller 500A includes an external interface 510, a settings input part 520, a control-program execution part 530, a constraint-condition change part 540, a workpiece simulation part 550, a sensor simulation part 561, and an input/output switching part 570. A configuration of each constituent element described above will be described below in detail.

The external interface 510 is configured to communicate with external equipment 600. The external interface 510 includes an actuator output part 511 and a sensor input part 512. The actuator output part 511 receives the drive information indicating an operation command value for controlling the actuator 610, and transmits a drive signal to the actuator 610 on the basis of the drive information. The sensor input part 512 receives a sensor signal from the sensor 620 and generates sensor information on the basis of the sensor signal. The external interface 510 may further include an other-equipment input/output part 513 that is connected to other equipment 630, which is external equipment other than the actuator 610 and the sensor 620. In this case, the external interface 510 is also connectable to the other equipment 630 in addition to the sensor 620 and the actuator 610. A specific configuration of each input/output part of the external interface 510 depends on the type of the external equipment 600 connected to the input/output part. For example, a specific configuration of an input/output part differs depending on whether the external equipment 600 is an I/O device, a servo amplifier, or another controller. When a servo amplifier is used, the function of the servo amplifier may be incorporated into the actuator 610. Alternatively, the function of the servo amplifier may be incorporated into the external interface 510; in this case, power is supplied via the drive signal to the servomotor.

The settings input part 520 receives input of a control program from a user in the same manner as that of a normal controller. The control program is a program for generating the drive information while referencing the sensor information. The actuator 610 is driven in accordance with this drive information. A characteristic point of the present embodiment is that the settings input part 520 receives input of constraint-condition setting information from the user. The constraint-condition setting information is instruction information that is associated with the control program in order to change constraint conditions that are assumed between the workpiece and the actuator 610.

The control-program execution part 530 processes the control program. The control-program execution part 530 includes a constraint-condition change instruction processor 531. The constraint-condition change instruction processor 531 issues a constraint-condition change instruction to the constraint-condition change part 540 on the basis of the constraint-condition setting information. In other words, the constraint-condition change instruction processor 531 issues a command to the constraint-condition change part 540 by processing the instruction information that is associated with the control program to change the constraint conditions.

The constraint-condition change part 540 manages the constraint conditions on the basis of the constraint-condition change instruction issued by the constraint-condition change instruction processor 531. For this purpose, the constraint-condition change part 540 includes a constraint-condition holder (not shown) for holding information about the constraint conditions at this point in time.

The workpiece simulation part 550 is configured to simulate the movement of a workpiece. Specifically, the workpiece simulation part 550 estimates the amount of movement of the workpiece from the drive information and estimates the current position of the workpiece by adding the estimated amount of movement to the previous position of the workpiece, the drive information being generated by the control-program execution part 530 and generated for, among at least one actuator 610, an actuator that is assumed to be constrained by the workpiece under the constraint conditions managed by the constraint-condition change part 540.

The sensor simulation part 561 is configured to simulate the operation of the sensor 620. Specifically, the sensor simulation part 561 generates sensor simulation information that simulates sensor information, by using information about the current position of the workpiece estimated by the workpiece simulation part 550.

The input/output switching part 570 is configured to switch a flow of signals in order to select the operation mode of the controller 500A. The input/output switching part 570 has at least a sensor simulation mode as an operation mode. In the present embodiment, the input/output switching part 570 further has a sensor operating mode as an operation mode.

Firstly, the sensor simulation mode will be described. In this mode, the input/output switching part 570 transmits the drive information generated by the control-program execution part 530 to at least the workpiece simulation part 550. The input/output switching part 570 also transmits the sensor simulation information generated by the sensor simulation part 561 as alternate information of the sensor information to the control-program execution part 530. Thus, the control-program execution part 530 operates using the simulated sensor information, instead of using the actual sensor information. Preferably, the input/output switching part 570 may transmit the drive information generated by the control-program execution part 530 to not only the workpiece simulation part 550 but also the actuator output part 511. More preferably, the input/output switching part 570 may be configured to be capable of selecting whether to transmit the drive information to the actuator output part 511 in this mode.

Secondly, the sensor operating mode will be described. In this mode, the input/output switching part 570 transmits the sensor information generated by the sensor input part 512 to the control-program execution part 530. Thus, the control-program execution part 530 operates using the sensor information generated by the sensor 620, instead of using the simulated sensor information. Accordingly, the conveyance system 700A operates under actual operating conditions.

Operations

A simulation operation performed by the workpiece simulation part 550 will now be described. First, the user inputs the control program, setting information about each of workpieces, actuators 610, and sensors 620, and external-input-signal switching information via the settings input part 520. The control program is transmitted to the control-program execution part 530 and stored therein. The setting information about each of workpieces, actuators 610, and sensors 620 is transmitted to the workpiece simulation part 550 and stored therein. The external-input-signal switching information is transmitted to the input/output switching part 570 and stored therein. The setting information about sensors 620 is transmitted to the sensor simulation part 561 of the external input simulation part 560 and stored therein. Part of information that is set as the setting information about workpieces is transmitted to the constraint-condition change part 540 and stored therein.

As described above, the control program is transmitted from the settings input part 520 to the control-program execution part 530. The control program is stored in the control-program execution part 530. The control program includes special-purpose instructions to enable a simulation, in addition to ordinary control instructions to control the external equipment 600 during actual operation. The special-purpose instructions include the following two types of instructions. The first type of instructions are constraint instructions that assume that a specified workpiece and a specified actuator 610 are constrained by each other. The second type of instructions are constraint release instructions that assume that constraints on a specified workpiece and a specified actuator 610 are released.

The special-purpose instructions make instruction information that is associated with the control program in order to change the constraint conditions assumed between the workpiece and the actuator 610. The constraint instructions are added to locations in control sequence where situations develop in which specific actuator operations act on workpieces. Examples of the locations include a location where a robot holds a workpiece, a location where a workpiece is disposed on a conveyer, and a location where an actuator that pushes a workpiece starts its push operation. These locations are locations in the program where instructions to operate the actuator are described. Thus, it is easy for the user to determine the locations to which constraint instructions are to be added. Contrary to the constraint instructions, the constraint release instructions are added to locations in control sequence where situations in which specific actuator operations act on the workpiece are released. Examples of the locations include a location where a robot installs a workpiece, a location where a workpiece is removed from a conveyer, and a location where the operation of an actuator pushing a workpiece is completed. These locations are usually locations in the program where instructions to operate the actuator are described or where instructions to confirm completion of actuator operations are described. Thus, it is easy for the user to determine the locations to which the constraint release instructions are to be added. As described above, the user can easily add special-purpose instructions as the constraint-condition setting information to the ordinary control program.

The constraint instructions and the constraint release instructions may represent the relationship between a single workpiece and each of a plurality of actuators 610. Thus, redundant constraint instructions or constraint release instructions may be issued for a single workpiece. For example, in the case where a workpiece is moved by the conveyor and thereafter removed from the conveyor by a direct-acting actuator, a constraint instruction is issued at the time when the workpiece is disposed on the conveyer, and another constraint instruction is issued at the time when the direct-acting actuator starts its push operation. Then, constraint release instructions are issued for both of the conveyer and the direct-acting actuator at the time when the push operation of the direct-acting actuator is completed. Note that a constraint instruction may be issued at the time when the workpiece to be pushed by the direct-acting actuator is determined, instead of at the time when the direct-acting actuator starts its push operation.

When the control-program execution part 530 executes a location in the control program where the constraint instruction or the constraint release instruction is described, the constraint-condition change instruction processor 531 is called in the control-program execution part 530. The constraint-condition change instruction processor 531 interprets the content of the instruction and issues a command for changing the constraint conditions of the workpiece to the constraint-condition change part 540.

As described above, the setting information is transmitted from the settings input part 520 to the constraint-condition change part 540. The setting information is stored in the constraint-condition change part 540. This setting information includes setting information for determining a workpiece for which the constraint-condition change part 540 manages the constraint conditions. For example, the setting information includes information such as the name of the workpiece. The constraint-condition change part 540 manages the constraint conditions of each workpiece in accordance with the command from the constraint-condition change instruction processor 531. In other words, the constraint-condition change part 540 manages which workpiece is assumed to be constrained by which actuator 610. The constraint-condition change part 540 then outputs the constraint conditions of each workpiece to the workpiece simulation part 550.

As described above, the setting information is transmitted from the settings input part 520 to the workpiece simulation part 550. The setting information is stored in the workpiece simulation part 550. This setting information includes setting information about workpieces, actuators 610, and sensors 620. The workpiece simulation part 550 also receives input of the constraint conditions of each workpiece from the constraint-condition change part 540 as described above. The workpiece simulation part 550 also receives the drive information about the actuator 610 from the input/output switching part 570. This information signal from the input/output switching part 570 may be a copy that is generated within the input/output switching part 570 from the information signal transmitted from the input/output switching part 570 to the external interface 510.

FIG. 2 illustrates an example of the setting information about workpieces, stored in the workpiece simulation part 550. "Number" and "Name" are for distinguishing different workpieces. "Size (X, Y, Z)" indicates the size of a portion of the workpiece that is detected by the sensor 620 in an XYZ orthogonal coordinate system. "Initial Position/Posture (X, Y, Z, Rx, Ry, Rz)" indicates the position and posture of the workpiece in the initial state, X, Y, and Z representing positions in the XYZ orthogonal coordinate system, and Rx, Ry, and Rz respectively representing postures by the angles of rotation about X, Y, and Z axes.

FIG. 3 illustrates an example of the setting information about actuators 610, stored in the workpiece simulation part 550. "Number" and "Name" are for distinguishing different actuators 610. "Motion Direction" represents the direction of displacement of the actuator. "Size" represents the size in the motion direction of a portion of the actuator 610 that is detected by the sensor 620. "Initial Position" represents the position of the actuator in the initial state in the motion direction.

Figure 4:
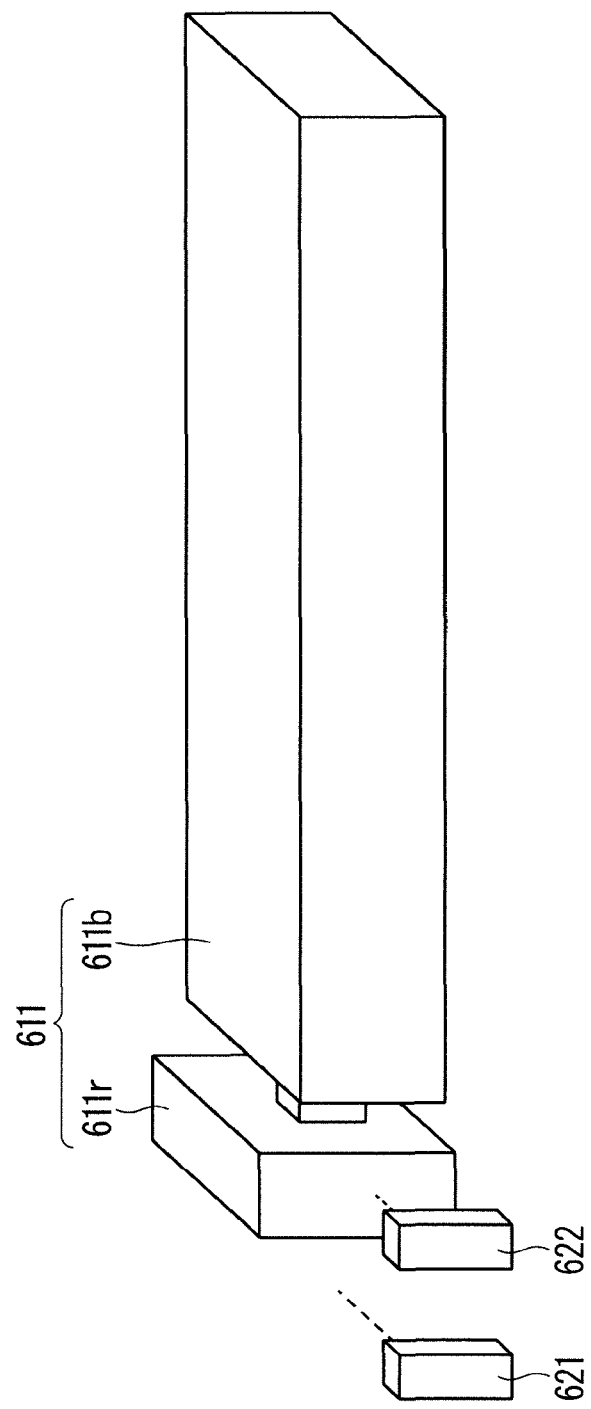
FIG. 4 is a perspective view showing an example of an actuator and a sensor in FIG. 1.

FIG. 4 is a perspective view of an actuator 611 and stock sensors 621 and 622 as an example of the actuator 610 and the sensor 620 (FIG. 1). The actuator 611 includes a stationary part 611*b* and a rod part 611*r*. The stationary part 611*b* is a part that drives the rod part 611*r*. The rod part 611*r* is a part that acts directly on the workpiece. When the rod part 611*r* is extended, the actuator 611 is detected by the reflection type optical stock sensor 621, and when the rod is retracted, the actuator 611 is detected by the reflection type optical stock sensor 622. In this configuration, the size of the actuator 611 corresponds to the thickness (horizontal dimension in the diagram) of a portion of the rod part 611*r* that can be detected by the stock sensor 621 or 622.

Figure 5:
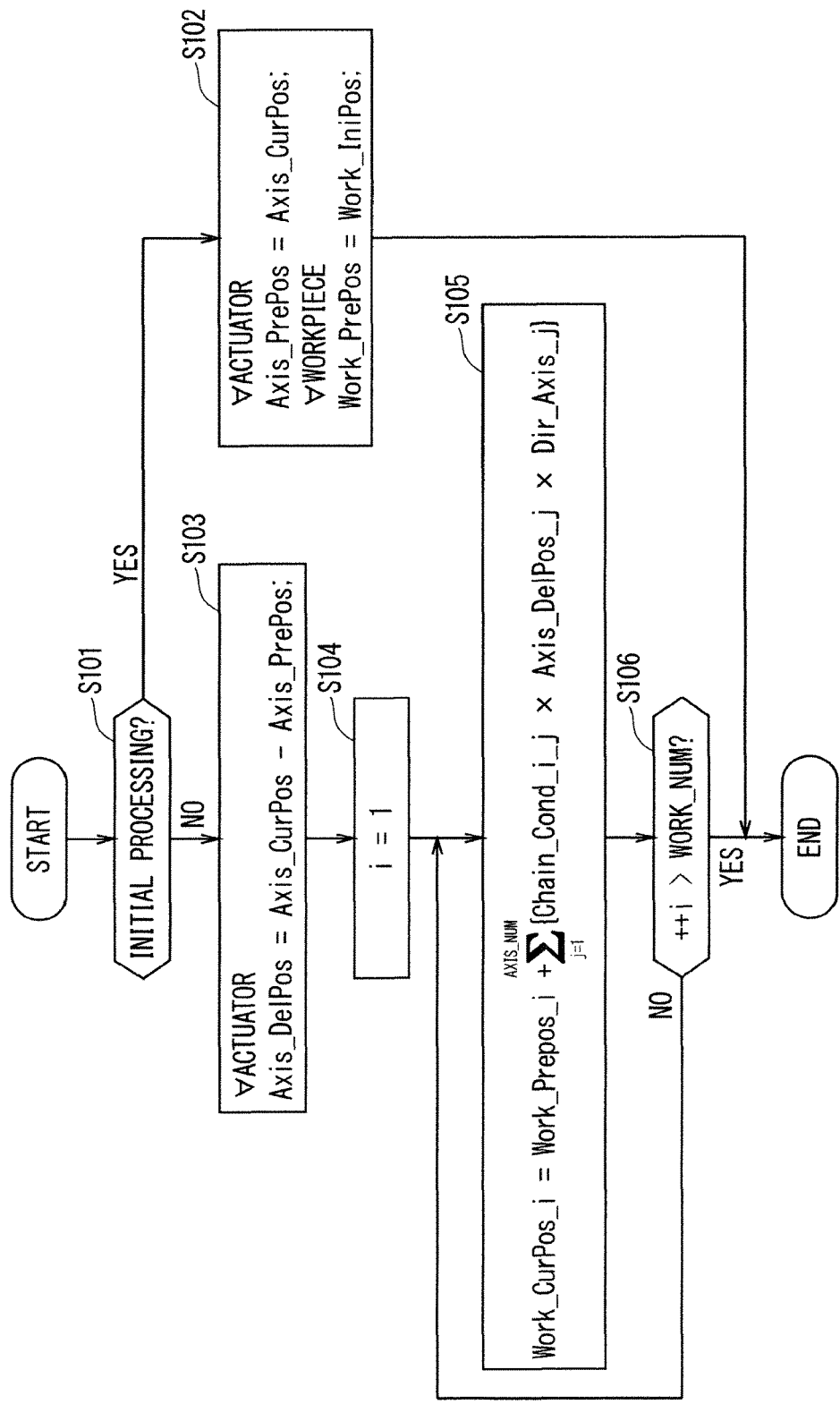
FIG. 5 is a flowchart schematically illustrating operations of a workpiece simulation part in FIG. 1.

FIG. 5 is a flowchart schematically illustrating the operation of the workpiece simulation part 550. A method for simulating the position of a workpiece, performed by the workpiece simulation part 550, will be described hereinafter with reference to FIG. 5.

First, it is determined in step S101 whether simulation processing is processing called as initial processing. When the answer is determined to be "YES," the processing proceeds to step S102. In step S102, for all the actuators 610, a numerical value of the current position of the actuator 610 is assigned to a variable of the previous position of the actuator 610. Moreover, for all the workpieces, the initial position of the workpiece, which is input as the setting information about workpieces, is assigned to a variable of the previous position of the workpiece. In FIG. 5, "∀" is a symbol representing "for all." "Axis_PrePos," "Axis_CurPos," "Work_PrePos," and "Work_IniPos" respectively represent the previous position of the actuator 610, the current position of the actuator 610, the previous position of the workpiece, and the initial position of the workpiece. Then, the processing ends.

Thereafter, simulation processing is called again. In this case, the answer is determined to be "NO" in step S101. Thus, the processing proceeds to step S103. In step S103, for all the actuators 610, a value obtained by subtracting the previous position of the actuator 610 from the current position of the actuator 610 is assigned to a variable for the amount of displacement of the actuator 610. In FIG. 5, "Axis_DelPos" represents the amount of displacement of the actuator 610. Thereafter, a value "1" is assigned to a counter variable i in step S104.

In step S105, the position of the workpiece numbered i is calculated as follows. For every one of the actuators 610 that is assumed to be constrained by the workpiece numbered i under the constraint conditions, the amount of displacement calculated in step S103 is multiplied by the motion direction of the actuator. Then, a total value of the calculated values is added to the previous position of the workpiece. In FIG. 5, "Work_CurPos_i" and "Work_PrePos_i" respectively represent the current position and previous position of the workpiece numbered i. Also, "Chain_Cond_i_j" represents the constraint condition assumed between the workpiece numbered i and the actuator numbered j. Here, the constraint condition is assumed to take a value of "1" when the workpiece and the actuator are constrained by each other, and take a value of "0" when the workpiece and the actuator are not constrained. "Dir_Axis_j" represents the motion direction of the actuator 610 numbered j. "AXIS_NUM" represents the total number of actuators 610.

In step S106, the counter variable i is incremented by 1, and it is determined whether the counter variable i is greater than the total number of workpieces. When the answer is determined to be "NO," the processing returns to step S105. In the diagram, "++i" represents adding 1 to the variable i. "WORK_NUM" represents the total number of workpieces.

If step S105 is repeated the same number of times as the total number of workpieces, the answer is determined to be "NO" in step S106. In that case, the processing ends. When the above-described processing has ended, the workpiece simulation part 550 outputs the calculated workpiece position information to the external input simulation part 560.

FIG. 6 illustrates an example of the setting information about sensors 620, stored in the sensor simulation part 561 of the external input simulation part 560. "Number" and "Name" are for distinguishing different sensors 620. "Normal Output" represents an output value in a state in which "Detection Target" is not detected at "Detection Position."

Figure 7:
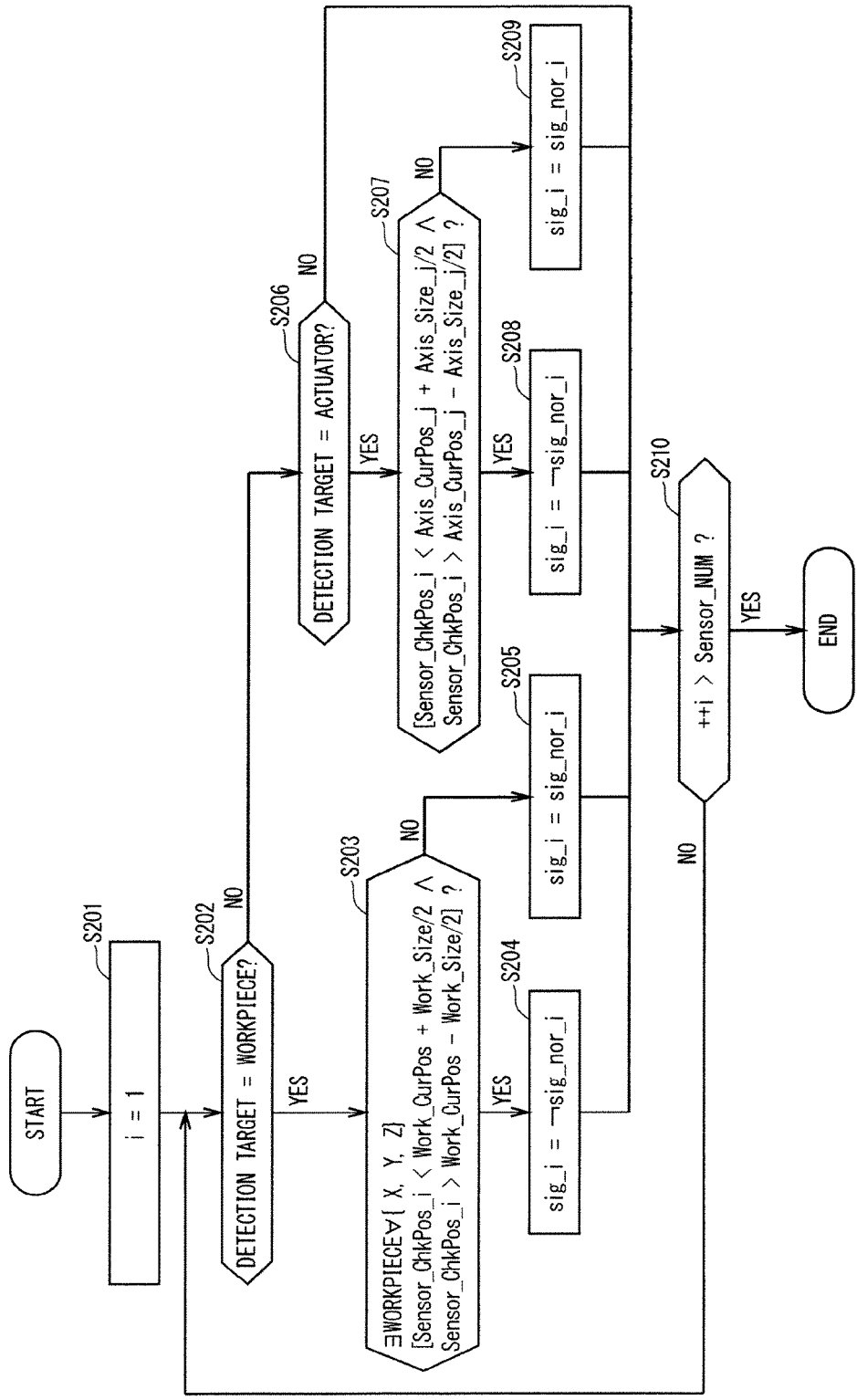
FIG. 7 is a flowchart schematically illustrating operations of a sensor simulation part in FIG. 1.

FIG. 7 is a flowchart schematically illustrating the operation of the sensor simulation part 561. As described above, the sensor simulation part 561 receives input of the setting information about sensors 620 from the settings input part 520, and input of the position information about workpieces from the workpiece simulation part 550. Using this pieces of information, the sensor simulation part 561 simulates the state of the sensor 620. This simulation method will be described hereinafter with reference to FIG. 7.

In step S201, a value of "1" is assigned to a counter variable i. In step S202, it is determined whether a detection target of the sensor 620 numbered i is a workpiece. If the answer is determined to be "YES," the processing proceeds to step S203.

In step S203, for all of the X, Y, and Z directions, it is determined whether there is a workpiece that satisfies the following conditions, namely that a value obtained by adding a half value of the size of the workpiece to be detected to the position of the workpiece is greater than the detection position of the sensor numbered i, and that a value obtained by subtracting the half value of the size of the workpiece to be detected from the position of the workpiece is smaller than the detection position of the sensor numbered i. Using the half value of the size of the workpiece is because the position of the workpiece corresponds to the midpoint of the workpiece. In the diagram, "∃" is a symbol representing "there exists," and "∧" represents conjunction of the conditions. "Sensor_ChkPos_i" represents the detection position of the sensor numbered i. "Work_CurPos" and "Work_Size" respectively represent the position and size of the workpiece.

When the answer is determined to be "YES" in step S203, the processing proceeds to step S204. In step S204, as the sensor simulation information, the output signal of the sensor numbered i is assumed to be an inversion of normal output. In the diagram, "¬" is a symbol representing "logical NOT." Moreover, "sig_i" and "sig_nor_i" respectively represent the output of the sensor numbered i as the simulation information and the normal output of the sensor numbered i. When the answer is determined to be "NO" in step S203, the processing proceeds to step S205. In step S205, as the sensor simulation information, the output signal of the sensor numbered i is assumed to be normal output. In either case, the processing subsequently proceeds to step S210.

On the other hand, if the answer is determined to be "NO" in step S202, the processing proceeds to step S206. In step S206, it is determined whether the detection target of the sensor numbered i is an actuator 610.

If the answer is determined to be "YES" in step S206, the processing proceeds to step S207. In step S207, it is determined whether the actuator satisfies the following conditions, namely that a value obtained by adding a half value of the size of the actuator to the position of the actuator that is to be detected and numbered j is greater than the detection position of the sensor 620, and that a value obtained by subtracting the half value of the size of the actuator from the position of the actuator that is to be detected and numbered j is smaller than the detection position of the sensor 620 numbered i. In the diagram, "Axis_CurPos_j" and "Axis_Size_j" respectively represent the position and size of the actuator that is to be detected and numbered j.

If the answer is determined to be "YES" in step S207, the processing proceeds to step S208. In step S208, as the sensor simulation information. the output signal of the sensor numbered i is assumed to be an inversion of normal output. If the answer is determined to be "NO" in step S207, the processing proceeds to step S209. In step S209, as the sensor simulation information, the output signal of the sensor numbered i is assumed to be normal output. In either case, the processing subsequently proceeds to step S210. On the other hand, if the answer is determined to be "NO" in step S206, the processing proceeds to step S210.

In step S210, the counter variable i is incremented by 1, and it is determined whether the counter value i is greater than the total number of sensors 620. In FIG. 6, "Sensor_NUM" represents the total number of sensors 620. If the answer is determined to be "NO," the processing returns to step S202.

If the processing from step S202 is repeated the same number of times as the total number of sensor, the answer is determined to be "YES" in step S210. In that case, the processing ends. When the above-described processing has ended, the sensor simulation part 561 outputs information that is calculated by the above-described processing and represents the output signal of the sensor, i.e., the sensor simulation information that simulates the sensor information, to the input/output switching part 570.

The input/output switching part 570 transmits and receives information signals in accordance with the operation mode according to the external-input-signal switching information that is input from the settings input part 520. When the operation mode is the simulation mode, the input/output switching part 570 substitutes the aforementioned sensor simulation information for the sensor information that is input from the sensor input part 512 of the external interface 510, and outputs the sensor simulation information to the control-program execution part 530. When the operation mode is the sensor operating mode, the input/output switching part 570 outputs the sensor information to the control-program execution part 530, without making the aforementioned substitution.

Note that the external-input-signal switching information may be information that collectively specifies, for all the sensors 620, whether the operation mode is the simulation mode or the sensor operating mode. Alternatively, the external-input-signal switching information may be information that individually specifies, for each sensor 620, whether the operation mode is the simulation mode or the sensor operating mode. The individual specification may be made by, for example, inputting a listing of information to the settings input part 520.

Advantageous Effects

According to the present embodiment, the sensor simulation information that simulates the sensor information is generated using the information about the estimated current position of the workpiece. The current position of the workpiece is estimated by adding the estimated amount of movement of the workpiece to the previous position of the workpiece. The amount of movement of the workpiece is estimated from the drive information that is generated by the control-program execution part 530 and generated for, among at least one actuator 610, an actuator that is assumed to be constrained by the workpiece under the constraint conditions. The constraint conditions are managed on the basis of the constraint-condition setting information. The constraint-condition setting information can be created easily by a user referencing the control program of the conveyance system, without depending heavily on the type of the conveyance system. Thus, a simulation of the sensor information can be performed easily without depending heavily on the type of the conveyance system. The obtained sensor simulation information can be used as alternate information when the conveyance system is tested in the absence of the sensor information, or as reference information under actual operating conditions of the conveyance system.

The estimated amount of movement of the workpiece can be obtained easily from the drive information that is generated by the control-program execution part 530 and generated for, among at least one actuator 610, an actuator that is assumed to be constrained by the workpiece under the constraint conditions managed by the constraint-condition change part 540. This estimated amount of movement is added to the previous position of the workpiece to estimate the current position of the workpiece. As described above, the estimated amount of movement of the workpiece can be obtained easily from the drive information, and the current position of the workpiece can be estimated easily through simple computation using the estimated amount of movement. Thus, the current position of the workpiece can be estimated with less computation. Accordingly, even the controller 500A of the conveyance system, which usually has less calculation resources than a computer suitable for simulation applications, can perform a real-time simulation.

As described above, according to the present embodiment, a simulation of the sensor information can be performed easily and with use of the controller 500A of the conveyance system 700A, without depending heavily on the type of the conveyance system 700A.

More specifically, according to the present embodiment, a simulation is made possible by simply adding the following two pieces of information, in addition to ordinary information for operating the controller. As first information, information such as the sizes of the workpiece and the actuator 610 and the positional relationship therebetween is added. These pieces of information are obvious from the device configuration of the conveyance system 700A, and therefore it is easy for the user to add such information. As second information, the constraint-condition setting information is added. The constraint-condition setting information is instruction information that is associated with the ordinary control program. This instruction information include special-purpose instructions to change the constraint conditions assumed between the workpiece and the actuator 610. The locations to which the special-purpose instructions are to be added are before and after instructions relevant to the operations of the actuator 610 that act on the workpiece, and therefore it is easy for the user to distinguish such locations. Therefore, according to the present embodiment, the user can set a simulation method using a general-purpose technique according to a fixed procedure, whereas the user has conventionally been required to design such a simulation method in a trial-and-error manner in conformity with the configuration of the conveyance system.

The above-described simulation can be implemented with less calculation loads, unlike in the method using interference in a three-dimensional space, because the movement of the workpiece is calculated on the basis of the constraint conditions. Specifically, the amount of movement of the workpiece is calculated by simply adding the amount of displacement of the actuator 610 under the constraint conditions. Such a simple calculation can be processed with extremely less calculation loads than in other control processing performed within the controller 500A.

Moreover, in the sensor simulation mode, the input/output switching part 570 according to the present embodiment transmits the drive information generated by the control-program execution part 530 to the actuator output part 511. This allows the controller to perform an operation that involves generation of a drive signal in the actuator output part 511 while simulating the sensor information. Thus, in particular, even in the case where appropriate sensor information cannot be obtained because no workpieces are conveyed, it is possible to generate a drive signal that is transmitted to the actuator 610. Accordingly, the generation of a drive signal that is transmitted to the actuator 610 can be tested without conveying workpieces.

Moreover, in the sensor operating mode, the input/output switching part 570 according to the present embodiment transmits the sensor information generated by the sensor input part 512 to the control-program execution part 530. This allows the controller 500A to operate under actual operating conditions, using the sensor signal of the actual sensor 620.

The configurations of sensors and actuators described in detail above are merely examples, and other various configurations are also conceivable.

First Variation

The above has been a detailed description of the actuator 611 having a direct-acting axis driven by a servomotor as an example of the actuators 610. However, the configuration of the actuators 610 is not limited to this configuration. For example, the actuators 610 may include a conveyer and a stopper. The stopper as used herein refers to a device that restricts the movement of a workpiece flowing on the conveyer. For example, a fixed stopper that is installed at the trail end of the conveyer, and a slide stopper that is opened and closed by an I/O device are known.

FIG. 8 shows an example of setting information about conveyers serving as actuators. "Speed" represents the speed of the conveyer. The setting information also include the contents similar to those of the aforementioned setting information (FIG. 3). In the case where constraint conditions are set between a workpiece and a conveyer, the movement of the workpiece can be simulated by adding the amount of displacement of the conveyer to the position of the workpiece. When the conveyor is being driven, the amount of displacement of the conveyer is calculated as a value obtained by multiplying the motion direction in the setting information by speed, and when the conveyor is at rest, the amount of displacement of the conveyor is calculated as zero. In the case where the conveyer can operate in a reverse direction, the above calculation may be performed using a reverse motion direction during reverse operation of the conveyor.

FIG. 9 shows an example of setting information about stoppers serving as actuators. When constraint conditions are set between a workpiece and a stopper, the position of the workpiece is calculated as follows. First, the movement of the workpiece caused by displacement of the conveyer is calculated. If the position of the workpiece is greater than "Stop Position" of the stopper in a direction of "Stop Direction" of the stopper that is set to a value of "1," the position of the workpiece in that direction is defined by "Stop Position" of the stopper. In the case where the position of the workpiece is less than "Stop Position" of the stopper in a direction of "Stop Direction" of the stopper that is set to a value of "−1, " the position of the workpiece in that direction is defined by "Stop Position" of the stopper. In this way, the sign of "Stop direction" of the stopper corresponds to settings such as what direction, either positive or negative, the movement of the workpiece is restricted.

As another example of the actuators 610, a device such as a robot may be used. In the case of a machine such as a robot that has tip portions such as the fingers controlled by a plurality of drive parts that are joined together, the controller 500A solves kinematics in which the positions of the tip portions are calculated from position information about each drive part. In this case, the workpiece simulation part 550 receives input of terminal position information obtained by solving kinematics from the input/output switching part 570. The workpiece simulation part 550 calculates the amount of movement of the workpiece on the basis of the amounts of displacement of terminal positions obtained from the terminal position information. In the case where kinematics are solved within the controller 500A, a variety of complicated correction such as dead weight compensation may be performed. The workpiece simulation part 550 does not need to perform such complicated correction calculations because the terminal position information is input to the workpiece simulation part 550 as described above.

Second Variation

The workpiece simulation part 550 may handle not only a change in the position of the workpiece but also a change in the posture of the workpiece. In the case of handling a change in the posture of an article in a three-dimensional space, there arises a problem of how to define the center of rotation of the article. In order to reduce calculation loads on the workpiece simulation part 550 and to reduce the amount of setting information, it is desirable that the center of rotation be the center of the workpiece. In this case, the position information about the workpiece remains unchanged even if the posture of the workpiece has changed.

As illustrated in FIG. 10, the workpiece simulation part 550 may handle the shape of a workpiece 100 as a rectangular parallelepiped having sides that are respectively parallel to coordinate axes X, Y, and Z. In other words, the shape of the workpiece is simulated by a minimum rectangular parallelepiped 100A that contains the workpiece. In this case, the size of the workpiece changes depending on the posture of the workpiece. FIG. 10 illustrates that the posture is changed by an angle α (α is greater than or equal to 0° and less than or equal to 90°) in an XY plane. The square in solid lines represents the posture of the workpiece, and the square in dotted lines represents the minimum rectangular parallelepiped that contains the workpiece. When the size of the workpiece in the XY plane is expressed as (2x, 2y), the size of the minimum rectangular parallelepiped that contains the workpiece in the XY plane is calculated by:

$$(2(x \cdot \cos \alpha + y \cdot \sin \alpha), 2(x \cdot \sin \alpha + y \cdot \cos \alpha))$$

In this way, a change in the posture of the workpiece can be handled as a change in the size of the minimum rectangular parallelepiped that contains the workpiece. Note that this method is merely one example, and a change in the posture of the workpiece may also be handled by other various methods.

Embodiment 2

Configuration

Embodiment 1 described above assumes that the position of the part (action part) of the actuator 610 that acts on the workpiece can be accurately or approximately grasped by relatively simply using the drive information generated by the control-program execution part 530. However, there are also actuators that have more complicated relationships between the drive information and the positions of their action parts. In this case, the workpiece simulation part may be used to calculate the position of the action part. In other words, the workpiece simulation part may perform arithmetic processing for solving kinematics of the actuator. The present embodiment describes a case of using such a workpiece simulation part.

FIG. 11 is a perspective view of an actuator 612 for use in the present embodiment. The actuator 612 has a gripper 612h (action part) and a driver 612d. The gripper 612h is a terminal part of the actuator 612 and directly holds a workpiece. Thus, the gripper 612h is a part of the actuator 612 that acts directly on the workpiece. The driver 612d is a part of the actuator 612 that drives the gripper 612h. Specifically, the driver 612d is rotationally driven using itself as the axial center. The gripper 612h is spaced from the axial center and fixed to the driver 612d. Thus, the gripper 612h is displaced along a path on the circumference of a circle, along with the rotational movement of the driver 612d. Here, drive information that is given to the actuator 612 is information about an angular amount of rotation movement of the driver 612d. In order to grasp the position of the gripper 612h from this angular amount, it is necessary to use information about the relationship between the angular amount and the position so as to calculate the latter from the former.

Figure 12:
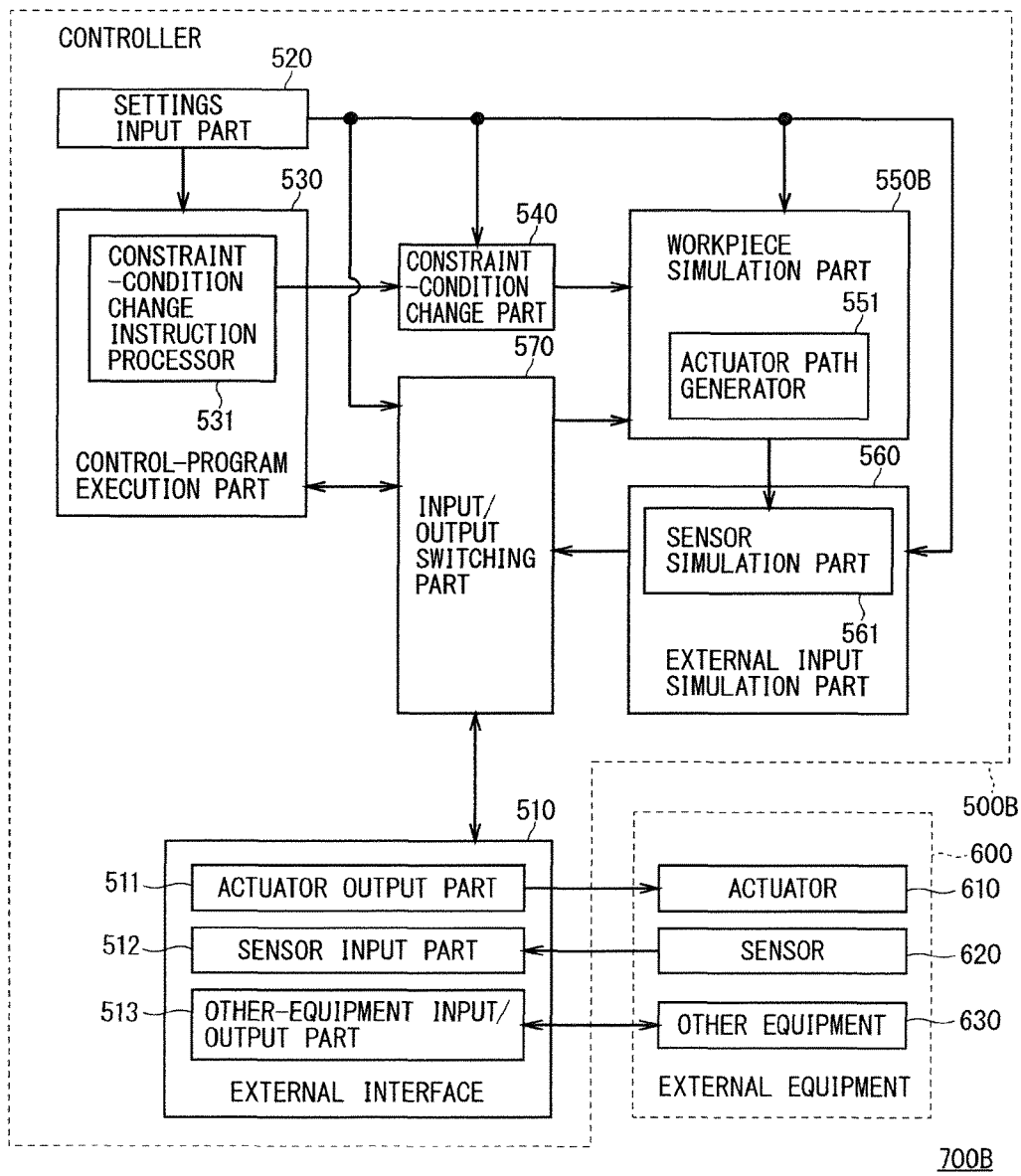
FIG. 12 is a block diagram schematically illustrating a configuration of the conveyance system according to Embodiment 2 of the present invention.

FIG. 12 is a block diagram schematically illustrating a configuration of a conveyance system 700B according to the present embodiment. The conveyance system 700B includes a controller 500B. In the present embodiment, at least one actuator 610 includes the actuator 612 (FIG. 11). The controller 500B includes a workpiece simulation part 550B. The workpiece simulation part 550B includes an actuator path generator 551.

In the present embodiment, the settings input part 520 receives user input of machine configuration information about the actuator 612 included in the actuator 610. The machine configuration information is information that is used in combination with the drive information generated by the control-program execution part 530 in order to calculate the position of the gripper 612h of the actuator 612. In other words, the machine configuration information is information that is used in combination with the drive information in order to calculate an operation path of the gripper 612h. The machine configuration information about the actuator 612 may be information that represents the distance from the axial center of the driver 612d to the gripper 612h and the direction from the driver 612d to the gripper 612h for the case where the angular amount is zero. The machine configuration information is transmitted to the actuator path generator 551.

The actuator path generator 551 includes a machine-configuration-information holder (not shown) that stores the machine configuration information about the actuator 612. The actuator path generator 551 calculates the path along which the gripper 612h of the actuator 610 operates, from the above-described machine configuration information and the drive information generated by the control-program execution part 530.

The configuration other than that described above is approximately the same as the configuration described above in Embodiment 1. Thus, constituent elements that are identical or correspond to those described above are given the same reference numerals, and descriptions thereof have been omitted.

Advantageous Effects

According to the present embodiment, the actuator path generator 551 calculates the path along which the gripper 612h of the actuator 612 operates. Thus, even in the case where the angular amount serving as the drive information generated by the control-program execution part 530 is not enough to calculate the position of the gripper 612h (action part) of the actuator 612, the position of the gripper 612h can be calculated through the aforementioned calculation of the path. More generally speaking, the action of the actuator 610 on the workpiece can be determined even in the case where the drive information generated by the control-program execution part 530 is not enough to determine the action of the actuator 610 on the workpiece. Accordingly, effects similar to those of Embodiment 1 can be achieved even in this case.

Variation

The actuator for which the actuator path generator 551 calculates the position of the action part is not limited to a rotatable actuator such as the actuator 612. For example, drive information for controlling an air cylinder may only be ON/OFF information that indicates the operation of an electromagnetic valve of the air cylinder. In this case, information such as the motion direction, speed, and stroke of the air cylinder may serve as machine configuration information about the actuator. The actuator path generator 551 may use this machine configuration information, in addition to the ON/OFF information, to calculate the position of the terminal end (action part) of the air cylinder.

Embodiment 3

Embodiments 1 and 2 described above assume that the entire or almost entire amount of displacement of the actuator (in Embodiment 2, the amount of displacement of the action part of the actuator) that is assumed to be constrained by the workpiece under the constraint conditions is reflected on the amount of movement of the workpiece. However, it could also happen that, depending on the configuration of the conveyance system, part of the amount of displacement of the actuator is not reflected on the amount of movement of the workpiece. If the amount of displacement that is not reflected is too much to ignore, the accuracy of simulation may deteriorate. The present embodiment intends to ensure the accuracy of simulation even in such a case.

Figure 13:
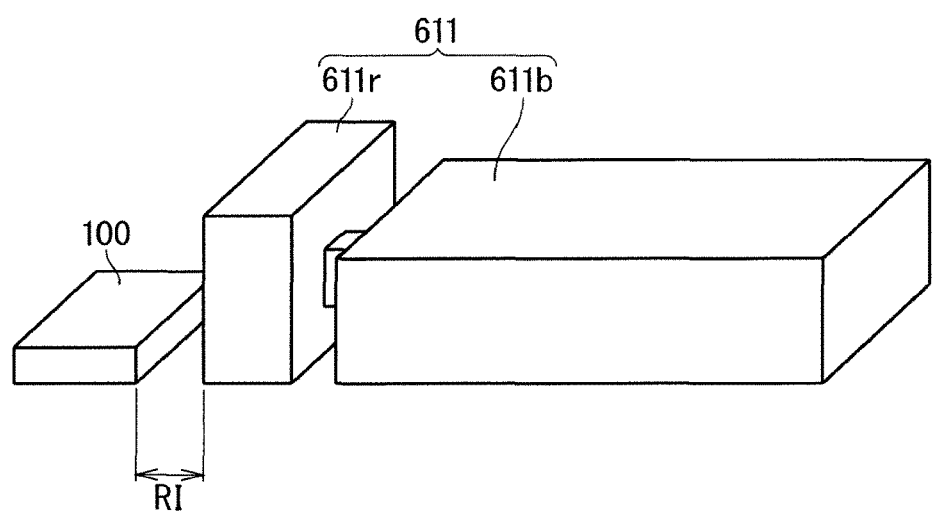
FIG. 13 is a perspective view showing an example of arrangement of an actuator included in a conveyance system and a workpiece on which the actuator acts according to Embodiment 3 of the present invention.

FIG. 13 is a perspective view showing an example of arrangement of an actuator 611 (the same one as that in FIG. 4) included in the conveyance system according to the present embodiment and a workpiece 100 on which the actuator 611 acts. According to the present embodiment, when the rod part 611r starts to move, there is a clearance RI between the rod part 611r and the workpiece 100. Thus, out of the total amount of displacement of the rod part 611r, the amount of displacement that is measured until the rod part 611r reaches the workpiece 100 makes an ineffective amount of displacement that is not reflected directly on the amount of movement of the workpiece. Here, the drive information generated for the actuator 611 by the control-program execution part 530 is ON/OFF information. Thus, the instruction information that is associated with the control program for changing the constraint conditions between the workpiece and the actuator 611 is assumed to be described before and after instructions to turn the actuator 611 on or off in a program list. From this, even while the actuator 611 is making an ineffective movement described above, the constraint conditions between the actuator 611 and the workpiece 100 indicate that the actuator 611 and the workpiece 100 are constrained by each other. Accordingly, in actuality, the displacement of the actuator 611 when passing through the clearance RI is a displacement that does not contribute directly to the movement of the workpiece 100, although the actuator 611 is assumed to be constrained by the workpiece 100 during that displacement. In other words, in the interval of displacement of the actuator 611, the clearance RI makes an ineffective part that does not contribute to the amount of movement of the workpiece, i.e., an ineffective action interval. It is thus necessary to grasp such an ineffective part out of the amount of displacement of the actuator 611 in order to more accurately grasp the amount of movement of the workpiece 100.

Figure 14:
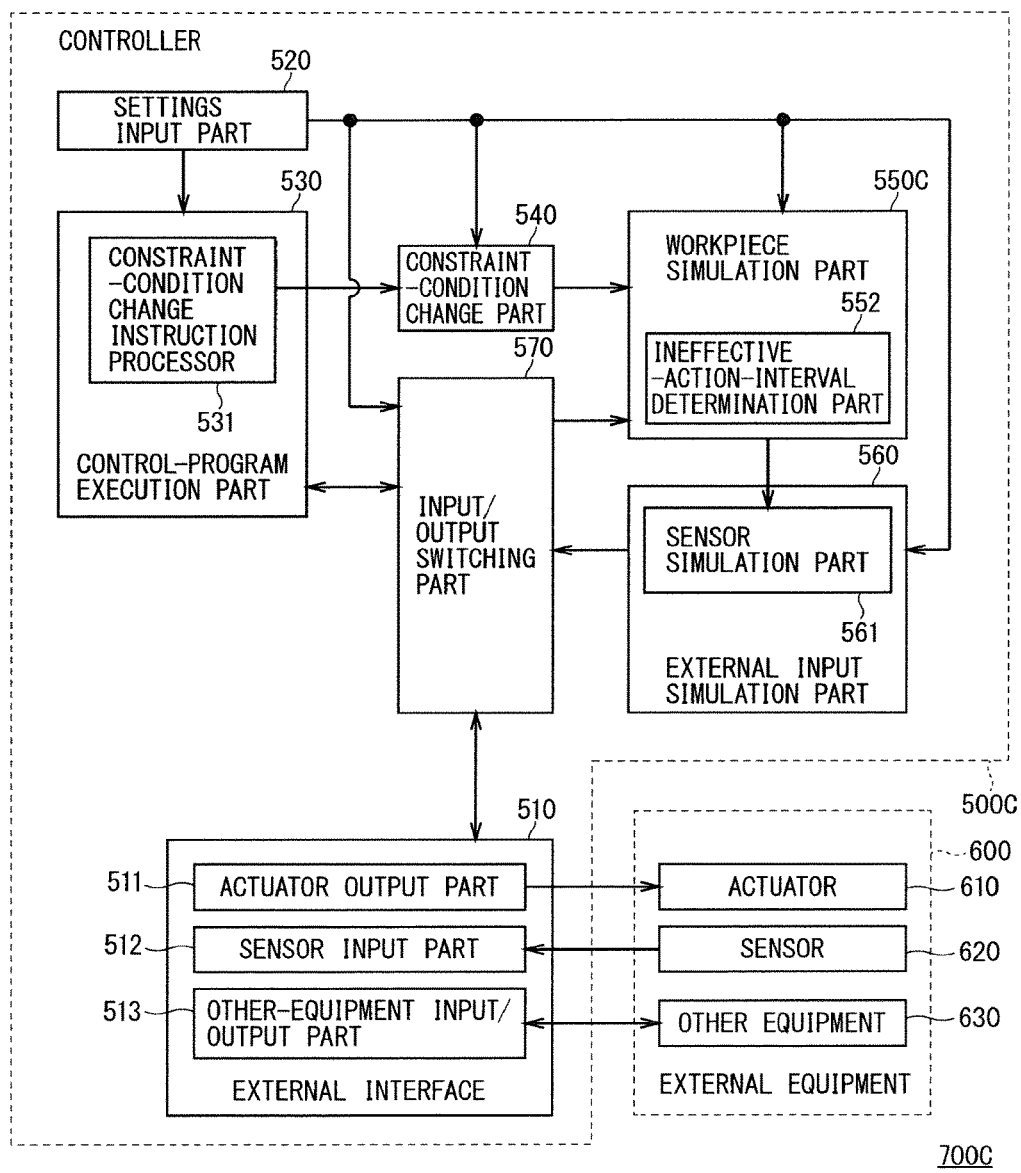
FIG. 14 is a block diagram schematically illustrating a configuration of the conveyance system according to Embodiment 3 of the present invention.

FIG. 14 is a block diagram schematically illustrating a configuration of a conveyance system 700C according to the present embodiment. According to the present embodiment, at least one actuator 610 includes the actuator 611 (FIG. 13) involving the ineffective action interval. The conveyance system 700C includes a controller 500C. The controller 500C includes a workpiece simulation part 550C. The workpiece simulation part 550C includes an ineffective-action-interval determination part 552. The ineffective-action-interval determination part 552 sets an ineffective part (ineffective action interval) that does not contribute to the amount of movement of the workpiece, out of the amount of displacement of the actuator 611 indicated by the drive information generated by the control-program execution part 530.

The ineffective action interval for each actuator 610 is input from the settings input part 520 to the workpiece simulation part 550C as setting information about actuators 610. The ineffective action interval may be set in the range of displacement of actuators 610, such as "from 0 to 100." In the case of calculating the amount of movement of the workpiece, the ineffective-action-interval determination part 552 determines whether the operation of the actuator 610 is a displacement within the ineffective action interval, and if so, does not reflect the amount of that displacement on the amount of movement of the workpiece. More specifically, the amount of that displacement is not added to the position of the workpiece.

The configuration other than that described above is approximately the same as the configurations described above in Embodiments 1 and 2. Thus, constituent elements that are identical or correspond to those described above are given the same reference numerals, and descriptions thereof have been omitted.

According to the present embodiment, the ineffective-action-interval determination part 552 sets an ineffective part out of the amount of movement. Thus, even in the case where the actuator 611 acts on the workpiece when the clearance RI exists between the workpiece and the actuator 611, the current position of the workpiece can be estimated with high accuracy and low calculation loads. More generally speaking, even in the case where the actuator starts to act on the workpiece in the midst of an operation instruction due to the presence of a clearance or other factors, the current position of the workpiece can be estimated with high accuracy and low calculation loads.

Embodiment 4

In Embodiments 1 to 3 described above, a simulation of the input signal information from the sensor 620, which is a stock sensor that detects the position of the workpiece or the actuator 610, is performed as a simulation of input signal information that is input from the external equipment 600 to the controller. On the other hand, a device for generating an input signal that is transmitted to the controller is not limited to a stock sensor. Input signals that are transmitted to the controller can also be generated by other devices such as some sort of sensors other than stock sensors, other controllers that communicate with the above controller, management computers, servers, and user interfaces. In view of this, the present embodiment describes a case where a simulation of input signal information is performed not only for the sensor 620 serving as a stock sensor, but also for at least one of the other equipment 630 such as that described above. Input signals that are input from the other equipment 630 to the controller may be generated immediately upon receipt of some sort of trigger signal, or may be generated after the elapse of a predetermined period of time from the receipt of some sort of trigger signal. Examples of the trigger signal include output signals received from the external interface of the controller, and time information signals. A start of control by the controller may also act as a kind of trigger signal.

Figure 15:
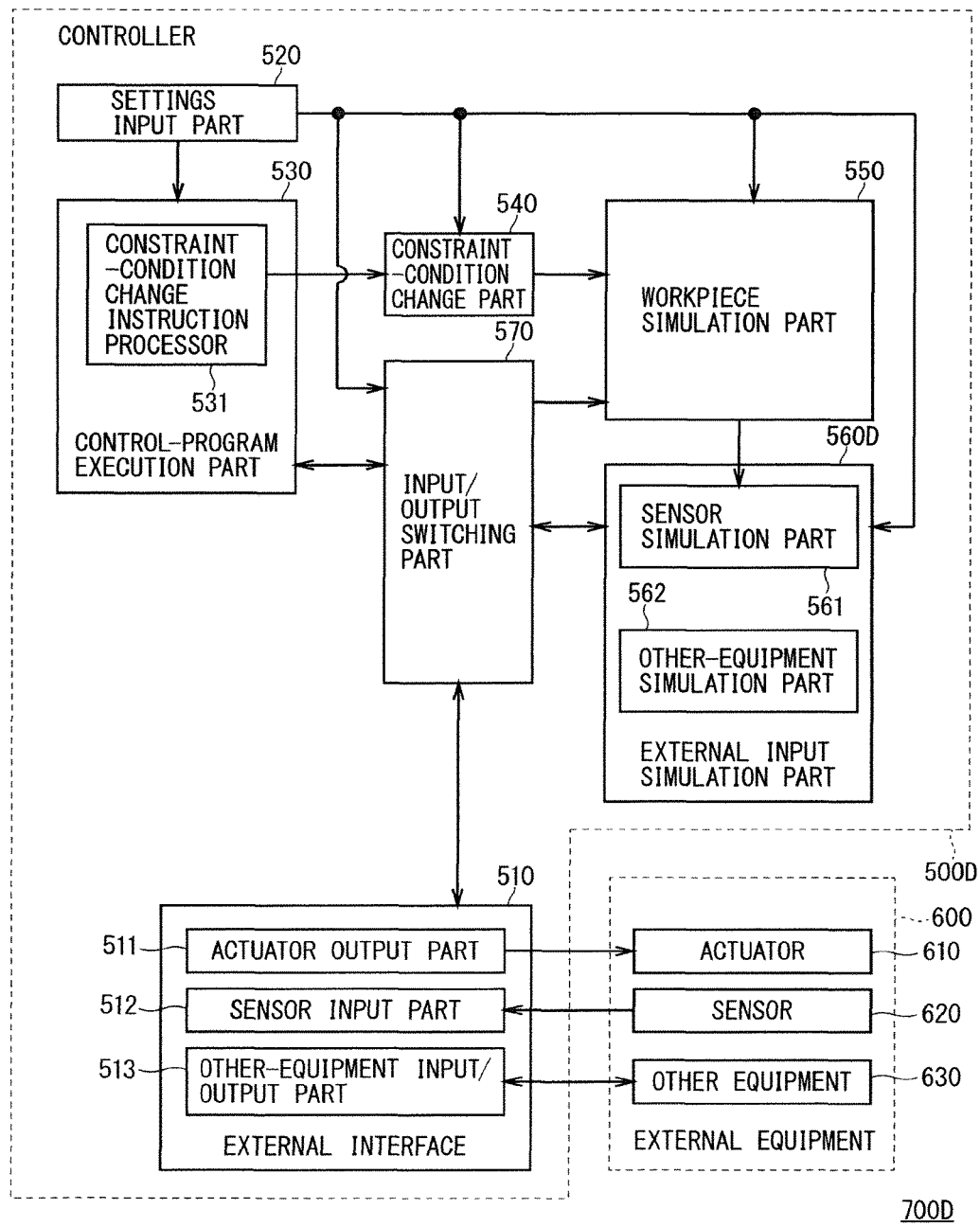
FIG. 15 is a block diagram schematically illustrating a configuration of a conveyance system according to Embodiment 4 of the present invention.

FIG. 15 is a block diagram schematically illustrating a configuration of a conveyance system 700D according to the present embodiment. The conveyance system 700D includes a controller 500D. The controller 500D includes an external input simulation part 560D. The external input simulation part 560D includes an other-equipment simulation part 562. The other-equipment simulation part 562 is configured to perform a simulation of at least one of the other equipment 630 that is an external device other than the sensor 620 serving as a stock sensor and other than the actuator 610. Specifically, the other-equipment simulation part 562 simulates input signal information received from at least one of the other equipment 630. The other-equipment simulation part 562 generates simulated signal information that simulates the input signal information received from the other equipment 630 on the basis of setting information about other equipment 630 that is input from the settings input part 520 and output signal information received from the input/output switching part 570. The output signal information as used herein corresponds to signal information that is transmitted from the input/output switching part 570 to the other-equipment input/output part 513 of the external interface 510 during actual operation of the conveyance system 700D. The simulated signal information generated by the other-equipment simulation part 562 is transmitted to the control-program execution part 530 as alternate information of at least part of the input signal information from the other equipment 630.

FIG. 16 shows an example of the setting information about other equipment 630. "Number" and "Name" are for distinguishing the simulated input signal information. "Trigger" represents the name of signal information serving as a trigger of the input signal information. "Delay Time" represents the amount of time from when the signal information serving as a trigger is generated to when the output of the simulated input signal information is changed. "Output" represents the output value of the simulated input signal information. The present example shows a simulation in which an input signal corresponding to "signal_1" is turned on 500 milliseconds after the turn-on of an output signal corresponding to "trigger_1." The input signal is, however, not limited to such an ON/OFF digital signal. For example, the diagram also shows a simulation in which an input signal corresponding to "signal_2" takes an output value of "100" three seconds after the turn-on of an output signal corresponding to "trigger_2." In this way, the input signal may represent data in any arbitrary form such as a numerical value, a character string, or a file.

The configuration other than that described above is approximately the same as the configurations described above in Embodiments 1 to 3. Thus, constituent elements that are identical or correspond to those described above are given the same reference numerals, and descriptions thereof have been omitted.

According to the present embodiment, the other-equipment simulation part 562 performs a simulation of the other equipment 630. This enables a simulation of the behavior of a variety of external equipment 600 that is connected to the controller 500D.

Embodiment 5

Depending on the purpose of the operation of the controller, it may be desired to invalidate an output signal that is output from the external interface 510 of the controller to at least one of the actuators 610. For example, there are cases where some or all of the actuators 610 have not been prepared yet, or where it is desired to check the control program of the controller without operating some or all of the actuators 610. The present embodiment describes a conveyance system that can handle those cases.

Figure 17:
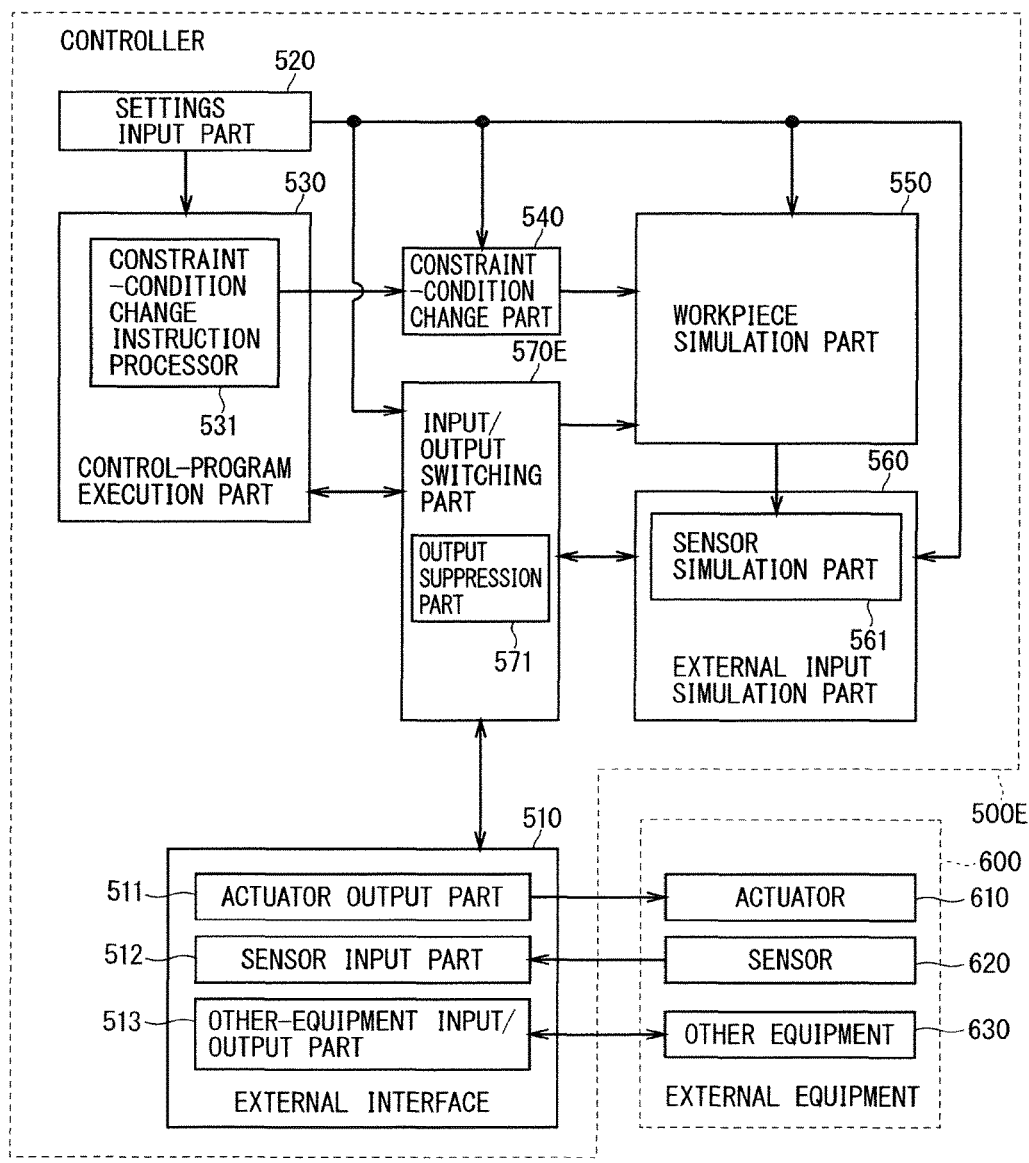
FIG. 17 is a block diagram schematically illustrating a configuration of a conveyance system according to Embodiment 5 of the present invention.

FIG. 17 is a block diagram schematically illustrating a configuration of a conveyance system 700E according to the present embodiment. The conveyance system 700E includes a controller 500E. The controller 500E includes an input/output switching part 570E. The input/output switching part 570E includes an output suppression part 571. The output suppression part 571 is configured to be capable of temporarily invalidating the output of the drive information to the actuator output part 511. Although the output to the actuator output part 511 is invalidated, the output to at least one of the workpiece simulation part 550 and the external input simulation part 560 may be maintained as necessary.

The configuration other than that described above is approximately the same as the configurations described above in Embodiments 1 to 4. Thus, constituent elements that are identical or correspond to those described above are given the same reference numerals, and descriptions thereof have been omitted.

According to the present embodiment, the input/output switching part 570E includes the output suppression part 571 that is capable of temporarily invalidating the output of the drive information to the actuator output part 511. Accordingly, the controller 500E can be tested without preparing the actuators 610 or without causing the actuators 610 to actually operate.

While the present embodiment describes a case where the output of the drive information to the actuators 610 is invalidated, the output to the other equipment 630 may be invalidated as a variation.

Embodiment 6

Figure 18:
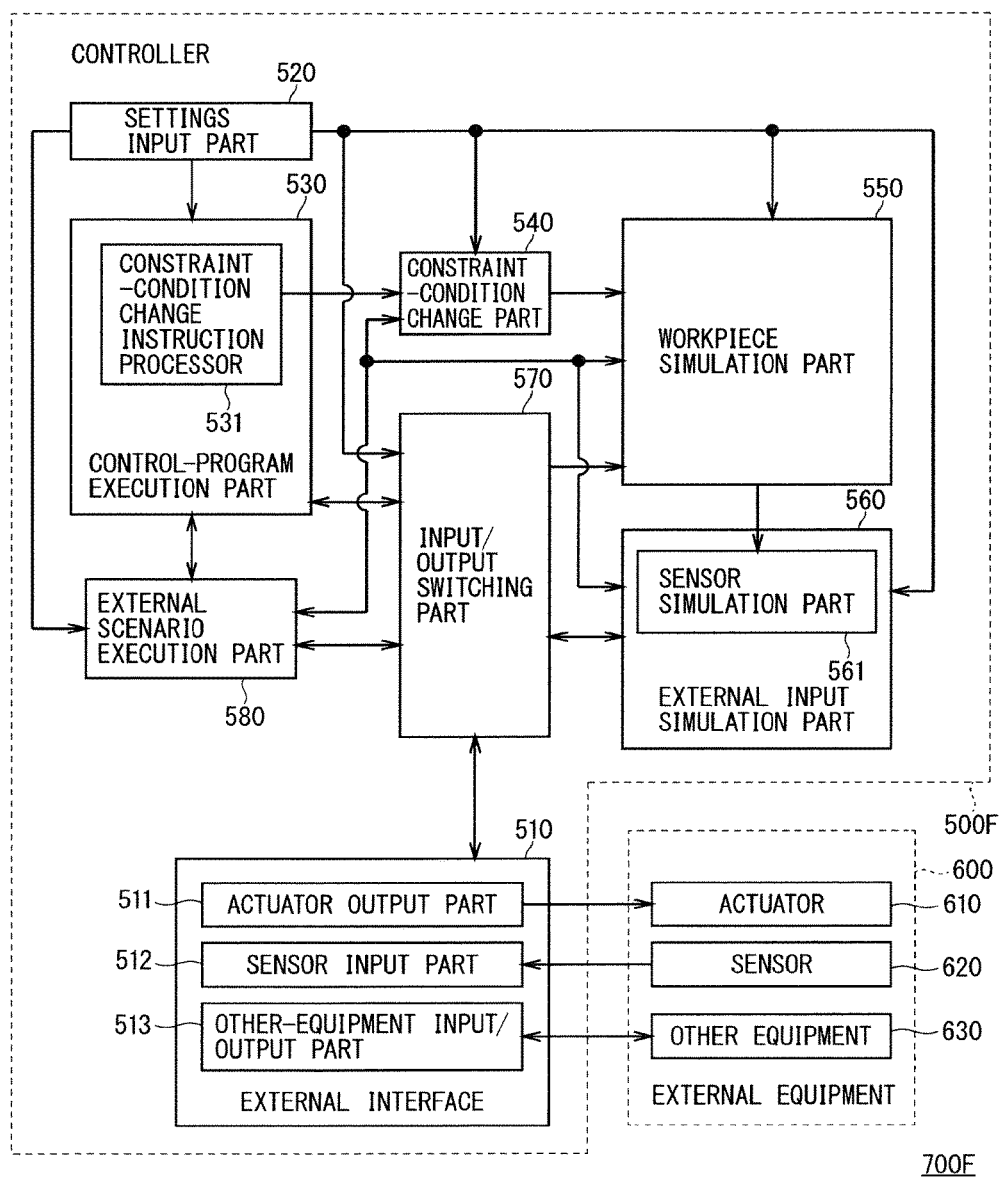
FIG. 18 is a block diagram schematically illustrating a configuration of a conveyance system according to Embodiment 6 of the present invention.

FIG. 18 is a block diagram schematically illustrating a configuration of a conveyance system 700F according to the present embodiment. The conveyance system 700F includes a controller 500F. The controller 500F includes an external scenario execution part 580. The external scenario execution part 580 is connected to various functional blocks in the controller 500F and issues a command to forcibly change a variety of data to each functional block in accordance with the content described in an external scenario. Specifically, the external scenario execution part 580 issues an instruction to forcibly change internal data of at least one of the control-program execution part 530, the constraint-condition change part 540, the workpiece simulation part 550, the sensor simulation part 561, and the input/output switching part 570. For example, an internal variable in the control program stored in the control-program execution part 530 may be changed. Alternatively, the constraint conditions stored in the constraint-condition change part 540 may be changed. Alternatively, a workpiece may be forcibly moved in simulation performed by the workpiece simulation part 550. Alternatively, information that is input from the workpiece simulation part 550 to the sensor simulation part 561 may be changed. Alternatively, the input/output signal in the input/output switching part 570 may be forcibly changed.

The format of the scenario processed by the external scenario execution part 580 only needs to be interpretable by the controller 500F. Thus, this scenario may be in the form of a set of instructions used by the control-program execution part 530, or may be a converted set of instructions used in the central processing unit (CPU).

The configuration other than that described above is approximately the same as the configurations described above in Embodiments 1 to 5. Thus, consistent elements that are identical or correspond to those described above are given the same reference numerals, and descriptions thereof have been omitted.

According to the present embodiment, the external scenario execution part 580 executes an external scenario in simulation. This reproduces the occurrence of various factors causing operating errors. In particular, it is possible to easily reproduce the occurrence of factors causing physical operating errors that are difficult to reproduce. This increases efficiency in the operation of debugging the control program. Here, examples of the factors causing operating errors include clogging of workpieces in the conveyor serving as an actuator 610, fluctuations of the input signal of the sensor 620 due to chattering or noise, and noise superimposed on signals received from other controllers as the other equipment 630.

Embodiment 7

FIG. 19 is a block diagram schematically illustrating a configuration of a conveyance system 700G according to the present embodiment. The conveyance system 700G includes a controller 500G. In the controller 500G, the input/output switching part 570 has a combined mode as an operation mode. In the combined mode, the input/output switching part 570 transmits the sensor information generated by the sensor input part 512 to each of the control-program execution part 530 and a signal comparator 590 and transmits the sensor simulation information generated by the sensor simulation part 561 to the signal comparator 590.

The controller 500G includes the aforementioned signal comparator 590. The signal comparator 590 compares the sensor information and the sensor simulation information. Preferably, the signal comparator 590 outputs a warning signal when there is a considerable difference between the sensor information and the sensor simulation information. Here, a condition for determining that "there is a considerable difference between the sensor information and the sensor simulation information" may be a condition that the difference between the values of signals indicated by the two pieces of information exceeds a preset fixed value, or may be a condition that the disparity between the two pieces of information continues for a predetermined period of time or more, or may be some sort of condition that is learned from operating situations. As another alternative, any arbitrary condition for determination may be used. The condition for determination may be previously given from the settings input part 520 to the signal comparator 590. In this case, the signal comparator 590 includes a determination condition holder (not shown) that stores a condition for determination.

The configuration other than that described above is approximately the same as the configurations described above in Embodiments 1 to 6. Thus, constituent elements that are identical or correspond to those described above are given the same reference numerals, and descriptions thereof have been omitted.

According to the present embodiment, the signal comparator 590 compares the sensor information and the sensor simulation information. Thus, the conveyance system 700G in action can be monitored in simulation. Specifically, the actual operating conditions can be monitored during actual operation, i.e., operation involving a flow of workpieces, by comparing the sensor simulation information that is a simulation result when the workpiece has made an ideal movement, and the sensor information that is output in accordance with the actual movement of the workpiece.

Exemplary Hardware Configuration of Controller

Figure 20:
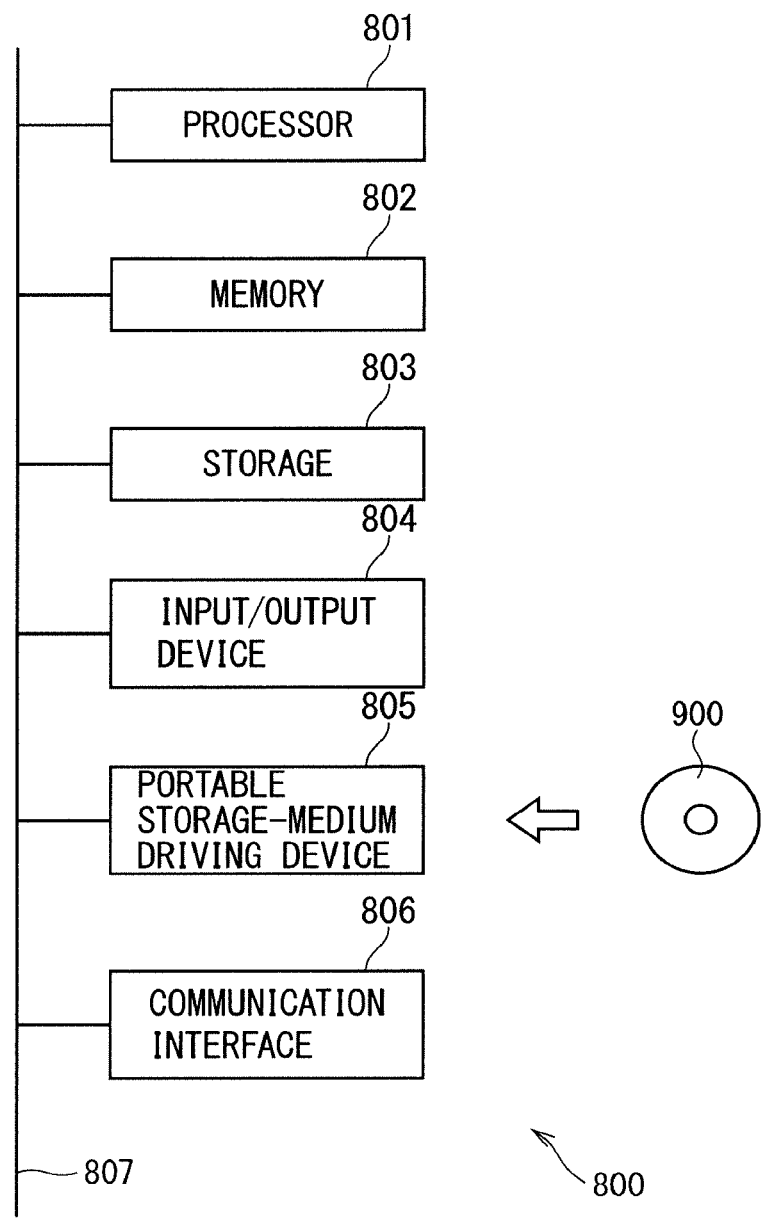
FIG. 20 is a block diagram showing an exemplary hardware configuration of a controller.

FIG. 20 is a block diagram schematically illustrating a hardware configuration of a controller 800 that can be used as one of the above-described controllers 500A to 500G. The controller 800 includes a processor (processing circuit) 801, a memory 802, a storage 803, an input/output device 804, a portable storage-medium driving device 805, a communication interface 806, and an internal bus 807. To describe correspondence with, for example, the controller 500A (FIG. 1), the external interface 510 may correspond to the communication interface 806. The settings input part 520 may correspond to the input part of the input/output device 804, the portable storage medium driving device 805, or the communication interface 806. The functions of the control-program execution part 530, the constraint-condition change part 540, the workpiece simulation part 550, the external input simulation part 560, and the input/output switching part 570 can be implemented by the processor 801 reading out programs stored in the storage 803 and executing the programs. The same applies to the controllers 500B to 500G other than the controller 500A.

The processor 801 executes arithmetic and logic computation in accordance with instructions in programs. The processor 801 may be configured to include a plurality of CPU cores. The memory 802 may be a main memory configured by, for example, a random access memory (RAM). The main memory stores loaded programs to be executed by the processor 801, and also stores data for use in the processing of the processor 801. The storage 803 is a storage device such as a hard disk drive (HDD) or a flash memory, and stores programs and a variety of data. The portable storage medium driving device 805 is a device that reads out programs or data stored in a portable storage medium 900. The portable storage medium 900 may, for example, be a magnetic disk, an optical disk, a magneto-optical disk, or a flash memory. The processor 801 executes programs stored in the storage 803 or the portable storage medium 900 while cooperating with the memory 802 and the storage 803. The input/output device 804 may, for example, be a keyboard, a touch panel, or a display. The input/output device 804 receives an operation instruction that is input by a user operation or other means, and outputs the result of processing performed by the controller 800.

It should be noted that the present invention can be implemented by freely combining embodiments or making a modification or omission on embodiments as appropriate without departing from the scope of the present invention. While the invention has been shown and described in detail, the foregoing description is in all aspects illustrative and not restrictive. It is therefore to be understood that numerous modifications and variations can be devised without departing from the scope of the invention.

EXPLANATION OF REFERENCE SIGNS

100: Workpiece, 500A to 500G and 800: Controller, 510: External interface, 511: Actuator output part, 512: Sensor input part, 513: Other-equipment input/output part, 520: Settings input part, 530: Control-program execution part, 531: Constraint-condition change instruction processor, 540: Constraint-condition change part, 550, 550B, 550C: Workpiece simulation part, 551: Actuator path generator, 552: Ineffective-action-interval determination part, 560: External input simulation part, 561: Sensor simulation part, 562: Other-equipment simulation part, 570, 570E: Input/output switching part, 571: Output suppression part, 580: External scenario execution part, 590: Signal comparator, 600: External equipment, 610 to 612: Actuator, 611*b*: Stationary part, 611*r*: Rod part, 612*d*: Drive part, 612*h*: Gripper, 620: Sensor, 621, 622: Stock sensor, 630: Other equipment, 700A to 700G: Conveyance system

The invention claimed is:

1. A controller for use in a conveyance system that outputs a drive signal to at least one actuator that conveys a workpiece while referencing a sensor signal received from at least one sensor that detects a workpiece, the controller comprising:

an external interface that includes an actuator output part and a sensor input part, the actuator output part receiving drive information for controlling the actuator, and transmitting the drive signal to the actuator in accordance with the drive information, and the sensor input part receiving the sensor signal from the sensor and generating sensor information in accordance with the sensor signal;

a settings input part that receives input of a control program and constraint-condition setting information from a user, the control program being a program for generating the drive information while referencing the sensor information, and the constraint-condition setting information being instruction information that is associated with the control program to change a constraint condition assumed between the workpiece and the actuator;

a control-program execution part that processes the control program and includes a constraint-condition change instruction processor that issues a constraint-condition change instruction in accordance with the constraint-condition setting information;

a constraint-condition change part that manages the constraint condition in accordance with the constraint-condition change instruction issued by the constraint-condition change instruction processor;

a workpiece simulation part that estimates an amount of movement of the workpiece from the drive information and estimates a current position of the workpiece by adding the amount of movement to a previous position of the workpiece, the drive information being generated by the control-program execution part and generated for, among the at least one actuator, an actuator that is assumed to be constrained by the workpiece under the constraint condition managed by the constraint-condition change part;

a sensor simulation part that uses information about the current position of the workpiece estimated by the workpiece simulation part to generate sensor simulation information that simulates the sensor information; and an input/output switching part that has at least a sensor simulation mode as an operation mode, wherein in the sensor simulation mode, the input/output switching part transmits the drive information generated by the control-program execution part to at least the workpiece simulation part and transmits the sensor simulation information generated by the sensor simulation part as alternate information of the sensor information to the control-program execution part.

2. The controller according to claim 1, wherein in the sensor simulation mode, the input/output switching part transmits the drive information generated by the control-program execution part to the actuator output part.

3. The controller according to claim 2, wherein the input/output switching part includes an output suppression part that is capable of temporarily invalidating an output of the drive information to the actuator output part.

4. The controller according to claim 1, wherein the input/output switching part further has a sensor operating mode, and in the sensor operating mode, the input/output switching part transmits the sensor information generated by the sensor input part to the control-program execution part.

5. The controller according to claim 1, further comprising:
a signal comparator,
wherein the input/output switching part further has a combined mode, and in the combined mode, the input/output switching part transmits the sensor information generated by the sensor input part to each of the control-program execution part and the signal comparator and transmits the sensor simulation information generated by the sensor simulation part to the signal comparator, and
the signal comparator compares the sensor information and the sensor simulation information.

6. The controller according to claim 1, wherein
the actuator includes an action part that acts on the workpiece,
the settings input part receives machine configuration information about the actuator, and
the workpiece simulation part includes an actuator path generator that calculates a path along which the action part of the actuator operates, from the machine configuration information about the actuator and the drive information generated by the control-program execution part.

7. The controller according to claim 1, wherein
the workpiece simulation part includes an ineffective-action-interval determination part that sets an ineffective part that does not contribute to the amount of movement of the workpiece out of an amount of displacement of the actuator indicated by the drive information.

8. The controller according to claim 1, wherein
the external interface is connectable to other equipment, in addition to the sensor and the actuator,
the controller further comprising:
other-equipment simulation part that performs a simulation of the other equipment.

9. The controller according to claim 1, further comprising:
an external scenario execution part that issues an instruction to change internal data of at least one of the control-program execution part, the constraint-condition change part, the workpiece simulation part, the sensor simulation part, and the input/output switching part.

10. A conveyance system comprising:
an actuator that conveys a workpiece;
a sensor that detects the workpiece; and
a controller for outputting a drive signal to the actuator while referencing a sensor signal received from the sensor,
the controller including:
an external interface that includes an actuator output part and a sensor input part, the actuator output part receiving drive information for controlling the actuator, and transmitting the drive signal to the actuator in accordance with the drive information, and the sensor input part receiving the sensor signal from the sensor and generating sensor information in accordance with the sensor signal;
a settings input part that receives input of a control program and constraint-condition setting information from a user, the control program being a program for generating the drive information while referencing the sensor information, and the constraint-condition setting information being instruction information that is associated with the control program to change a constraint condition assumed between the workpiece and the actuator;
a control-program execution part that processes the control program and includes a constraint-condition change instruction processor that issues a constraint-condition change instruction in accordance with the constraint-condition setting information;

a constraint-condition change part that manages the constraint condition in accordance with the constraint-condition change instruction issued by the constraint-condition change instruction processor;

a workpiece simulation part that estimates an amount of movement of the workpiece from the drive information and estimates a current position of the workpiece by adding the amount of movement to a previous position of the workpiece, the drive information being generated by the control-program execution part and generated for, among the at least one actuator, an actuator that is assumed to be constrained by the workpiece under the constraint condition managed by the constraint-condition change part;

a sensor simulation part that uses information about the current position of the workpiece estimated by the workpiece simulation part to generate sensor simulation information that simulates the sensor information; and an input/output switching part that has at least a sensor simulation mode as an operation mode, wherein in the sensor simulation mode, the input/output switching part transmits the drive information generated by the control-program execution part to at least the workpiece simulation part and transmits the sensor simulation information generated by the sensor simulation part as alternate information of the sensor information to the control-program execution part.

* * * * *